US007948135B2

(12) United States Patent
Sato et al.

(10) Patent No.: US 7,948,135 B2

(45) Date of Patent: May 24, 2011

(54) RADIAL ANISOTROPIC SINTERED MAGNET AND ITS PRODUCTION METHOD, MAGNET ROTOR USING SINTERED MAGNET, AND MOTOR USING MAGNET ROTOR

(75) Inventors: Koji Sato, Takefu (JP); Mitsuo Kawabata, Takefu (JP); Takehisa Minowa, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/574,046

(22) Filed: Oct. 6, 2009

(65) Prior Publication Data

US 2010/0019587 A1 Jan. 28, 2010

Related U.S. Application Data

(62) Division of application No. 11/229,660, filed on Sep. 20, 2005, now Pat. No. 7,618,496, which is a division of application No. 10/284,384, filed on Oct. 31, 2002, now Pat. No. 6,984,270.

(30) Foreign Application Priority Data

Oct. 31, 2001 (JP) ................................ 2001-334440
Oct. 31, 2001 (JP) ................................ 2001-334441
Oct. 31, 2001 (JP) ................................ 2001-334442
Oct. 31, 2001 (JP) ................................ 2001-334443

(51) Int. Cl.
*H02K 1/27* (2006.01)
*H01F 1/032* (2006.01)

(52) U.S. Cl. .................... 310/156.43; 148/101; 148/103

(58) Field of Classification Search ............. 310/156.38, 310/156.43, 156.47–156.49; 148/101, 103, 148/300, 302; 419/5, 6, 12, 19, 38
See application file for complete search history.

(56) References Cited

U.S. PATENT DOCUMENTS 4,678,634 A 7/1987 Tawara et al.

(Continued)

FOREIGN PATENT DOCUMENTS

GB 1019493 A 2/1966

(Continued)

OTHER PUBLICATIONS

Takahashi et al., "Multi-Pole Magnetization of Permanent Magnet with Only One Easy Direction of Magnetization," MAG-85-120-133, pp. 1-9, with abstract (1985).

(Continued)

*Primary Examiner* — Tran N Nguyen

(74) *Attorney, Agent, or Firm* — Birch, Stewart, Kolasch & Birch, LLP

(57) ABSTRACT

A radial anisotropic sintered magnet formed into a cylindrical shape includes a portion oriented in directions tilted at an angle of 30° or more from radial directions, the portion being contained in the magnet at a volume ratio in a range of 2% or more and 50% or less, and a portion oriented in radial directions or in directions tilted at an angle less than 30° from radial directions, the portion being the rest of the total volume of the magnet. The radial anisotropic sintered magnet has excellent magnet characteristics without occurrence of cracks in the steps of sintering and cooling for aging, even if the magnet has a shape of a small ratio between an inner diameter and an outer diameter.

12 Claims, 11 Drawing Sheets

U.S. PATENT DOCUMENTS

| | | | | |
|---|---|---|---|---|
| 4,963,320 | A | 10/1990 | Saito et al. | |
| 5,204,569 | A | 4/1993 | Hino et al. | |
| 5,506,557 | A | 4/1996 | Sakaguchi et al. | |
| 6,262,507 | B1 * | 7/2001 | Sato et al. | 310/152 |
| 7,201,809 | B2 | 4/2007 | Sato et al. | |

FOREIGN PATENT DOCUMENTS

| | | | |
|---|---|---|---|
| JP | 62-254413 | A | 11/1987 |
| JP | 02276210 | A | * 11/1990 |
| JP | 6-86484 | A | 3/1994 |
| JP | 6-260328 | A | 9/1994 |
| JP | 07-263266 | A | 10/1995 |
| JP | 11-054352 | A | 2/1999 |
| JP | 2000-116089 | A | 4/2000 |
| JP | 2000-116090 | A | 4/2000 |
| JP | 2000-175387 | A | 6/2000 |
| JP | 2004-153867 | A | 5/2004 |
| WO | WO-93/22778 | A1 | 11/1993 |
| WO | WO-99/07006 | A1 | 2/1999 |

OTHER PUBLICATIONS

Kools, “Complications in Firing Oriented Hexaferrites Due to Anisotropic Effects”, “Cracking of Radially Oriented Rings During Firing,” Scient of Ceramics, vol. 7, pp. 29-44, (1973).

Shimizu et al., “Anisotropic Ring Shape Sintered Nd-Fe-B Magnets”, Hitachi Kinzoku Gihou, vol. 6, pp. 33-66, Jan. 1990.

* cited by examiner

RADIAL ANISOTROPIC SINTERED MAGNET AND ITS PRODUCTION METHOD, MAGNET ROTOR USING SINTERED MAGNET, AND MOTOR USING MAGNET ROTOR

CROSS-REFERENCE TO RELATED APPLICATIONS

This application is a Divisional of co-pending application Ser. No. 11/229,660 filed on Sep. 20, 2005, which is a Divisional of application Ser. No. 10/284,384 filed on Oct. 31, 2002, now issued as U.S. Pat. No. 6,984,270 B2 on Jan. 10, 2006. Priority of both prior U.S. applications is claimed under 35 U.S.C. §120. Priority of Application Nos. 2001-334440, 2001-334441, 2001-334442 and 2001-334443 filed in Japan on Oct. 31, 2001 is also claimed under 35 U.S.C. §119. The entire contents of all of the above applications are hereby incorporated by reference.

BACKGROUND OF THE INVENTION

The present invention relates to a radial anisotropic sintered magnet and a method of producing a radial anisotropic sintered magnet. The present invention also relates to a cylindrical magnet rotor for a synchronous permanent magnet motor such as a servo-motor or a spindle motor, and an improved permanent magnet type motor using the cylindrical magnet rotor.

Anisotropic magnets, each produced by pulverizing a material having magnetic anisotropic crystals, such as ferrite or a rare earth alloy, and pressing the pulverized material in a specific magnetic field, have been extensively used for loudspeakers, motors, measuring instruments, and other electric components. Of these anisotropic magnets, those having radial anisotropy have been advantageously used for AC servo-motors, DC brushless motors, and the like because of excellent magnetic characteristics, free magnetization, and no need of reinforcement for fixing the magnets unlike segment type magnets. In particular, along with the recent tendency toward higher performances of motors, it has been required to develop long-sized radial anisotropic magnets.

Magnets oriented in radial directions have been produced by a vertical-field vertical molding process or a backward extrusion molding process. According to the vertical-field vertical molding process, magnetic fields are applied toward the center of a core in opposed directions parallel to the pressing direction, that is, the vertical direction. The magnetic fields are impinged against each other at the center of the core, to be turned in radial directions, whereby a magnet powder is oriented in the radial directions. To be more specific, as shown in FIGS. 2A and 2B, a vertical-field vertical molding process is carried out by packing a magnet powder 8 in a cavity between a die 3 and a core composed of an upper core part 4 and a lower core part 5, applying magnetic fields, generated by upper and lower orientation magnetic field coils 2, toward the center of the core in opposed directions parallel to the pressing direction, and pressing the packed magnet powder 8 in the vertical direction. In this process, the magnetic fields applied in the opposed directions parallel in the vertical direction are impinged against each other at the center of the core to be turned in radial directions, to pass through the die 3 toward a molding machine base 1, and the packed magnet powder 8 is pressed in the magnetic fields circulating in this magnetic circuit, to be thereby oriented in the radial directions. In the figures, reference numeral 6 denotes an upper punch and reference numeral 7 denotes a lower punch.

In this way, in the vertical-field vertical molding process, the magnetic fields generated by the coils form a magnetic path of the core, the die, the molding machine base, and the core. In this case, to reduce the leakage of the magnetic fields, a ferromagnetic material, particularly, a ferrous material is used as a material forming the magnetic path. A magnetic field intensity for orienting a magnet powder is, however, determined as follows. It is assumed that a core diameter be B (inner diameter of the packed magnet powder), a die diameter be A (outer diameter of the packed magnet powder), and a height of the packed magnet powder be L. The magnetic fluxes having entered the core composed of the upper and lower core parts are impinged against each other at the center of the core, to be turned in radial directions, and pass through the die. The amount of the magnetic fluxes having passed the core is determined by a saturated magnetic flux density of the core. The magnetic flux density of the core, if made from iron, is about 20 kG. Accordingly, the orientation magnetic field at each of the inner diameter and the outer diameter of the packed magnet powder is obtained by diving the amount of the magnetic fluxes having passed through the core by each of an inner area and an outer area of the packed magnet powder, as expressed below.

$$2\cdot\pi\cdot(B/2)^2\cdot 20/(\pi\cdot B\cdot L)=10\cdot B/L \text{ (inner periphery)}$$

$$2\cdot\pi\cdot(B/2)^2\cdot 20/(\pi\cdot A\cdot L)=10\cdot B^2/(A\cdot L) \text{ (outer periphery)}$$

The magnetic field at the outer periphery is smaller than that at the inner periphery. Accordingly, to obtain desirable orientation in the whole packed magnet powder, the magnetic field at the outer periphery, which is expressed by the equation of $10\cdot B^2/(A\cdot L)$, is required to be 10 kOe or more. As a result, by setting the magnetic field at the outer periphery to 10 (that is, $10\cdot B^2/(A\cdot L)=10$), an equation of $L=B^2/A$ is given. By the way, since the height of a molded body is about half the height of a packed magnet powder and is further reduced to about 0.8 by sintering, the height of a finished magnet becomes very smaller than the height of the packed magnet powder. In this way, the size, that is, the height of a magnet allowed to be oriented is determined by the shape of a core because the magnetic saturation of the core determines the intensity of the orientation magnetic field. This is the reason why it has been difficult to produce cylindrical anisotropic magnets longer in the axial direction, particularly, when the magnets have small diameters.

On the other hand, the backward extrusion molding process requires a large, complicated molding machine, to degrade the production yield. Accordingly, it has been difficult to produce radial anisotropic magnets at a low cost.

In this way, it has been difficult to produce radial anisotropic magnets in any method, and has been further difficult to produce radial anisotropic magnets on the large scale at a low cost, resulting in the significantly raised cost of motors using the radial anisotropic magnets thus produced.

In the case of producing radial anisotropic ring-shaped magnets by using a sintering process, there arises the following problem: namely, if a stress generated in the steps of sintering and cooling for aging due to a difference between a coefficient of linear thermal expansion in the C-axis direction of the magnet and a coefficient of linear thermal expansion in the direction perpendicular to the C-axis direction of the magnet is larger than a mechanical strength of the magnet, there may occur cracks. For example, in the case of producing R—Fe—B based sintered magnets, as disclosed in Hitachi Metals Technical Report Vol. 6, p 33-36, only a magnet shaped with a ratio between an inner diameter and an outer diameter set in a range of 0.6 or more has been produceable without occurrence of cracks. Further, in the case of producing R—(Fe—Co)—B based sintered magnets, since Co replaced from Fe is not only contained in a 2-14-1 phase as a main phase in an alloy structure but also forms $R_3Co$ in an R-rich phase, a mechanical strength is significantly reduced, and since the Curie temperature is high, a difference between a coefficient of linear thermal expansion in the C-axis direction and a coefficient of linear thermal expansion in the direction perpendicular to the C-axis direction in a temperature range from the Curie temperature to room temperature at the time of cooling becomes large, with a result that a residual stress as a cause of cracking becomes large. For this reason, the shape limitation to the R—(Fe—Co)—B based radial anisotropic ring-shaped magnets is more strict than the shape limitation to the R—Fe—B based magnets not containing Co. In actual, only the R—(Fe—Co)—B based magnets shaped with a ratio between an inner diameter and an outer diameter set in a range of 0.9 or more have been stably produceable. For the same reason, ferrite magnets and Sm—Co based magnets have been difficult to be stably produced without occurrence of cracks.

From the result of examination by F. Kools on a ferrite magnet (F. Kools: Science of Ceramics. Vol. 7, (1973), 29-45), a residual stress in a peripheral direction, regarded as a cause of cracks of radial anisotropic magnets in the step of sintering and cooling for aging, is expressed by the following equation:

$$\sigma_\theta=\Delta T\Delta\alpha EK^2/(1-K^2)\cdot(K\beta_k\eta^{k-1}-K\beta_{-k}\eta^{-k-1}-1) \quad (1)$$

where $\sigma_\theta$: stress in peripheral direction $\Delta T$: difference in temperature $\Delta\alpha$: difference in coefficient of linear thermal expansion ($\alpha\|-\alpha\perp$)

E: Young's modulus in orientation direction $K^2$: anisotropic ratio of Young's modulus ($E\perp/E\|$)

$\eta$: position (r/outer diameter)

$\beta_k$: $(1-\rho^{1+k})/(1-\rho^{2k})$ $\rho$: ratio between inner diameter and outer diameter (inner diameter/outer diameter)

In the equation (1), the term exerting the largest effect on a cause of cracking is $\Delta\alpha$: difference in coefficient of linear thermal expansion ($\alpha\|-\alpha\perp$). For ferrite magnets, Sm—Co based rare earth magnets, and Nd—Fe—B based rare earth magnets, a difference between a coefficient of thermal expansion in the crystal direction and a coefficient of thermal expansion in the direction perpendicular to the crystal direction (anisotropy in thermal expansion) appears at the Curie temperature and increases with a decrease in temperature at the time of cooling, with a result that a residual stress becomes larger than the mechanical strength, resulting in occurrence of cracks.

The stress due to a difference between the thermal expansion in each orientation direction of a cylindrical magnet and the thermal expansion in the direction perpendicular to the orientation direction of the cylindrical magnet, expressed in the above-described equation (1), is generated due to the fact that the cylindrical magnet is radially oriented along the radial direction. Accordingly, if a cylindrical magnet containing a suitable volume % of a portion oriented in directions different from radial directions is produced, such a cylindrical magnet will be probably not cracked. For example, a cylindrical magnet oriented in one direction perpendicular to the axial direction of the cylindrical magnet, which is produced by a horizontal-field vertical molding process, is not cracked even if the cylindrical magnet is either of a ferrite magnet, an Sm—Co based rare earth magnet, an Nd—Fe(Co)—B based rare earth magnet.

Even in the case of using a cylindrical magnet of a type different from a radial anisotropic magnet, if the cylindrical magnet can be subjected to multipolar magnetization so as to obtain a sufficiently high magnetic flux density and a small variation in magnetic fluxes between magnetic poles, such a cylindrical magnet can be used as a magnet for high-performance permanent magnet motors. For example, a method of producing a cylindrical multipolar magnet for permanent magnet motors different from any radial anisotropic magnet has been proposed in the paper "Electricity Society Magnetics Research Group, Material No. MAG-85-120 (1985)". In this method, a cylindrical multipolar magnet is produced by preparing a cylindrical magnet oriented in one direction perpendicular to the axial direction of the cylindrical magnet by a horizontal-field vertical molding process and subjecting the cylindrical magnet to multipolar magnetization. The magnet oriented in one direction perpendicular to the axial direction of the cylindrical magnet (hereinafter, referred to as "diametrically oriented cylindrical magnet") produced by the horizontal-field vertical molding process is advantageous in that the height of the magnet can be made as large as possible (about 50 mm or more) within the allowable range of a cavity of a pressing machine and further a number of the molded bodies can be formed by one pressing (hereinafter, referred to as "multiple pressing"), with a result that inexpensive cylindrical multipolar magnets for permanent magnet motors can be provided in place of expensive radial anisotropic magnets.

The above-described cylindrical magnet, produced by preparing a diametrically oriented cylindrical magnet by the horizontal-field vertical molding process and subjecting the cylindrical magnet to multipolar magnetization, however, has a problem from the practical viewpoint. Namely, a magnetic pole located near in the orientation magnetic field direction has a high magnetic flux density but a magnetic pole located in a direction perpendicular to the orientation magnetic field direction has a low magnetic flux density, and accordingly, when a motor incorporated with the magnet is rotated, there may occur an uneven torque due to a variation in magnetic flux density between the magnetic poles. In this way, such a cylindrical magnet cannot be regarded as usable from the practical viewpoint.

To solve the above-described problem, a patent document 1 has proposed a technique in which, assuming that the number of magnetized poles in the peripheral direction of a cylindrical magnet produced by the horizontal-field vertical molding process so as to be oriented in one direction perpendicular to the axial direction of the cylindrical magnet is 2n (n: positive integer larger than 1 and smaller than 50), the number of teeth of a stator to be combined with the cylindrical magnet is set to 3m (m: positive integer larger than 1 and smaller than 33). A patent document 2 has proposed a technique in which, assuming that the number of magnetized poles in the peripheral direction of a cylindrical magnet produced by the horizontal-field vertical molding process so as to be oriented in one direction perpendicular to the axial direction of the cylindrical magnet is k (k: positive even number larger than 4), the number of teeth of a stator to be combined with the cylindrical magnet is set to 3k·j/2 (j: positive integer larger than 1). A patent document 3 has proposed a technique in which an uneven torque of a cylindrical magnet oriented in one direction perpendicular to the axial direction of the cylindrical magnet is reduced by dividing the cylindrical magnet into a plurality of cylindrical magnet units, and stacking the cylindrical magnet units to each other in such a manner that the cylindrical magnet units are sequentially offset from each other at a specific angle in the peripheral direction.

In each of the techniques disclosed in the patent documents 1 to 3, although the uneven torque can be reduced, the volume ratio of a diametrically oriented portion to the total volume of the ring-shaped magnet is small, with a result that a total torque of a motor incorporated with the magnet is as small as 70% of a total torque of a motor incorporated with a radial anisotropic magnet having the same magnetic characteristics. Accordingly, the magnet disclosed in each of the patent documents 1 to 3 has been not practically used.

The documents used for above description are as follows:

Patent Document 1: Japanese Patent Laid-open No. 2002-116089

Patent Document 2: Japanese Patent Laid-open No. 2000-116090

Patent Document 3: Japanese Patent Laid-open No. 2000-175387

Non-patent Document 1: Hitachi Metals Technical Report Vol. 6, p 33-36

Non-patent Document 2: F. Kools: Science of Ceramics. Vol. 7, (1973), p 29-45

Non-patent Document 3: Electricity Society Magnetics Research Group, Material No. MAG-85-120, 1985

SUMMARY OF THE INVENTION

A first object of the present invention is to provide a radial anisotropic sintered magnet having excellent magnet characteristics, which is capable of preventing occurrence of cracks at the time of sintering and cooling for aging even if the magnet has a shape of small ratio between an inner diameter and an outer diameter.

A second object of the present invention is to provide a method of producing a radial anisotropic magnet, which is capable of easily producing a number of long-sized magnets by one molding, thereby realizing an inexpensive, high-performance permanent magnet motor by using the magnet thus produced.

A third object of the present invention is to provide an inexpensive, high-performance permanent magnet motor.

A fourth object of the present invention is to provide a multistage long-sized multipolar magnetized cylindrical magnet rotor produceable on a large scale at a low cost, which is produced by multipolar-magnetizing a cylindrical magnet different from any radial anisotropic magnet in such a manner that a magnetic flux density on its surface is high and a variation in magnetic flux density between magnetic poles is low, and stacking a plurality of the multipolar magnetized cylindrical magnets to each other, whereby a high torque can be obtained without occurrence of any uneven torque when a motor incorporated with the magnet rotor composed of the stack of the multipolar magnetized cylindrical magnets is rotated, and to provide a permanent magnet type motor using the magnet rotor.

To achieve the first object, according to a first aspect of the present invention, there is provided a radial anisotropic sintered magnet formed into a cylindrical shape, including: a portion oriented in directions tilted at an angle of 30° or more from radial directions, the portion being contained in the magnet at a volume ratio in a range of 2% or more and 50% or less; and a portion oriented in radial directions or in directions tilted at an angle less than 30° from radial directions, the portion being the rest of the total volume of the magnet.

To achieve the first object, according to a second aspect of the present invention, there is provided a method of producing a radial anisotropic sintered magnet, including the steps of: preparing a metal mold having a core including, in at least part thereof, a ferromagnetic body having a saturated magnetic flux density of 5 kG or more; packing a magnet powder in a cavity of the metal mold; and molding the magnet powder while applying an orientation magnetic field to the magnet powder by a horizontal-field vertical molding process. In this method, a magnetic field generated in the horizontal-field vertical molding step is preferably in a range of 0.5 to 12 kOe.

The present invention also provides a method of producing a radial anisotropic sintered magnet, comprising the steps of:

preparing a metal mold having at least one non-magnetic body in a die portion of the metal mold so as to be located in a region spread radially from the center of the metal mold at a total angle of 20° or more and 180° or less;

packing a magnet power in a cavity of the metal mold; and molding the magnet power while applying a magnetic field to the magnet power by a vertical-field vertical molding process.

That is to say, as a result of examination to achieve the first object, the present inventors have found that a cylindrical magnet can be stably obtained without occurrence of cracks in the steps of sintering and cooling for aging by orienting the cylindrical magnet in radial directions, except for a portion in which the orientation directions are purposely offset from radial directions, with a result that a motor incorporated with the cylindrical magnet can exhibit a large torque.

According to this first invention, an R—Fe(Co)—B based radial anisotropic sintered magnet having excellent magnet characteristics such as equalized magnetic fields can be produced without occurrence of cracks in the steps of sintering and cooling for aging, even if the magnet has a shape of a small ratio between an inner diameter and an outer diameter. This is useful for increasing the performances and powers and reducing the sizes of magnets for AC servo-motors, DC brushless motors, and loudspeakers. In particular, the first invention is effective to produce diametrical two-polar magnetized magnets used for throttle valves for automobiles, and makes it possible to stably produce cylindrical magnets for high-performance synchronous magnet motors on a large scale.

To achieve the second object, according to a third aspect of the present invention, there is provided a method of producing a radial anisotropic magnet, including the steps of: preparing a metal mold having a core including, in at least part thereof, a ferromagnetic body having a saturated magnetic flux density of 5 kG or more; packing a magnet powder in a cavity of the metal mold; and molding the magnet powder while applying an orientation magnetic field to the magnet powder by a horizontal-field vertical molding process;

wherein the method further comprises at least one of the following steps (i) to (v):

(i) rotating, during the period in which the magnetic field is applied to the magnet powder, the magnet powder in the peripheral direction of the metal mold at a specific angle;

(ii) rotating, after the magnetic field is applied to the magnet powder, the magnet powder in the peripheral direction of the metal mold at a specific angle, and then applying a magnetic field again to the magnet powder;

(iii) rotating, during the period in which the magnetic field is applied to the magnet powder, a magnetic field generating coil relative to the magnet powder in the peripheral direction of the metal mold at a specific angle;

(iv) rotating, after the magnetic field is applied to the magnet powder, a magnetic field generating coil relative to the magnet powder in the peripheral direction of the metal mold at a specific angle, and then applying a magnetic field again to the magnet powder; and (v) disposing two pairs or more of magnetic field generating coils, and applying a magnetic field to the magnet powder by one pair of the magnetic field generating coils, and then applying a magnetic field to the magnet powder by another pair of the magnetic field generating coils.

In this method, preferably, the rotation of the packed magnet powder is performed by rotating at least one of the core, the die, and a punch in the peripheral direction, and preferably, when the magnet powder is rotated after the magnetic field is applied to the magnet powder, the value of residual magnetization of the ferromagnetic core or the magnet powder is 50 G or more, and the rotation of the magnet powder is performed by rotating the core in the peripheral direction. In this case, a magnetic field generated in the vertical-field vertical molding step is preferably in a range of 0.5 to 12 kOe.

According to this second invention, it is possible to easily produce a number of long-sized cylindrical magnets by one molding without use of expensive radial anisotropic magnets produced with a low productivity, and to realize high-performance permanent magnet motors using diametrically oriented cylindrical magnets produced by the horizontal-field vertical molding process capable of stably providing the cylindrical magnets with equalized magnetic fields at a low cost. This is advantageous in reducing the cost of high-performance motors such as AC servo-motors and DC brushless motors.

To achieve the third object, according to a fourth aspect of the present invention, there is provided a permanent magnet motor using a permanent magnet which is multipolar magnetized in the peripheral direction, including: a stator having a plurality of teeth; and a radial anisotropic cylindrical magnet assembled in the motor so as to be combined with the stator; wherein the radial anisotropic cylindrical magnet is produced by preparing a metal mold having a core including, in at least part thereof, a ferromagnetic body having a saturated magnetic flux density of 5 kG or more, packing a magnet powder in a cavity of the metal mold, and molding the magnet powder while applying an orientation magnetic field to the magnet powder by a horizontal-field vertical molding process; and assuming that the number of magnetized poles in the peripheral direction of the cylindrical magnet is 2n (n: positive integer in a range of 2 or more and 50 or less), the number of the teeth of the stator to be combined with the cylindrical magnet is set to 3m (m: positive integer in a range of 2 or more and 33 or less) and the values 2n and 3m satisfy a relationship of $2n \neq 3m$.

In this permanent magnet rotor, preferably, assuming that the number of magnetized poles in the peripheral direction of the cylindrical magnet is k (k: positive even number of 4 or more), the number of the teeth of the stator to be combined with the cylindrical magnet is set to $3k \cdot j/2$ (j: positive integer in a range of 1 or more). A boundary between an N-pole and an S-pole of the cylindrical magnet is preferably located in a region offset at an angle within ±10° from the center of a portion oriented in directions tilted at an angle of 30° or more from radial directions. A skew angle of the cylindrical magnet is preferably in a range of 1/10 to 2/3 of a spanned angle of one magnetic pole of the cylindrical magnet. A skew angle of the teeth of the stator is preferably in a range of 1/10 to 2/3 of a spanned angle of one magnetic pole of the cylindrical magnet. The magnetic field generated in the horizontal-field vertical molding step is preferably in a range of 0.5 to 12 kOe.

According to the third invention, long-sized cylindrical magnets used for synchronous magnet rotors having high-performances can be produced at a low cost on a large scale.

To achieve the fourth aspect, according to a fifth aspect of the present invention, there is provided a multistage long-sized multipolar magnetized cylindrical magnet rotor including: a plurality of radial anisotropic cylindrical magnets stacked in two stages or more in the axial direction; wherein each of the plurality of radial anisotropic cylindrical magnets is produced by preparing a metal mold having a core including, in at least part thereof, a ferromagnetic body having a saturated magnetic flux density of 5 kG or more, packing a magnet powder in a cavity of the metal mold, molding the magnet powder while applying an orientation magnetic field to the magnet powder by a horizontal-field vertical molding process, and multipolar-magnetizing the cylindrical magnet thus produced.

In this magnet rotor, preferably, assuming that the stacked number of the cylindrical magnets is i (i: positive integer in a range of 2 or more and 10 or less), the cylindrical magnets of the number of i are stacked to each other while being sequentially offset from each other in such a manner that the same direction as an orientation magnetic field direction of each of the cylindrical magnets is offset from the next stacked one of the cylindrical magnets by an angle of 180°/i. Also, preferably, assuming that the number of the multipolar magnetized magnetic poles is n (n: positive integer in a range of 4 or more and 50 or less), the stacked number i and the number n of the poles satisfy a relationship of $i = n/2$. Preferably, at the time of multipolar magnetization of the poles of the number n on an outer peripheral surface of the cylindrical magnet, assuming that a spanned angle of one magnetic pole is 360°/n, skew magnetization is performed with a screw angle in a range of 1/10 to 2/3 of the angle 360°/n.

To achieve the fourth object, according to a sixth aspect of the present invention, there is provided a permanent magnet motor using the above-described multistage long-sized multipolar magnetized magnet rotor.

According to the fourth invention, it is possible to produce a multistage long-sized multipolar magnetized cylindrical magnet rotor for a motor, which is capable of significantly reducing a variation in magnetic flux density between magnetic poles, thereby realizing smooth rotation of the rotor at a high torque without any uneven torque, and to produce a permanent magnet type motor using a multistage long-sized multipolar magnetized cylindrical magnet rotor.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, preferred embodiments of the present invention will be described in details with reference to the accompanying drawings.

A radial anisotropic sintered magnet according to the present invention is formed into a cylindrical shape and is oriented in radial directions as a whole, except that a portion of a volume ratio in a range of 2% or more and 50% or less on the basis of the total volume of the magnet is oriented in directions tilted from radial directions by an angle in a range of 30° or more and 90° or less.

In this way, the radial anisotropic sintered magnet according to the present invention contains 2 to 50% of the portion oriented in directions tilted at 30 to 90° from radial directions.

The stress expressed by the above-described equation (1) is generated in a magnet due to the fact that the magnet is a continuous magnet in the peripheral direction, that is, a cylindrical magnet oriented in radial directions. Accordingly, if the magnetic orientations of the magnet in radial directions are partially disturbed, the stress generated in the magnet may be probably reduced. In this regard, according to the present invention, to prevent occurrence of cracks in a cylindrical magnet due to the stress generated in the cylindrical magnet, a portion oriented in directions tilted at 30° or more from radial directions is contained in the cylindrical magnet at a volume ratio of 2% or more and 50% or less. If the volume ratio of the portion oriented in directions tilted at 30° or more from radial directions is less than 2%, the effect of preventing occurrence of cracks is insufficient, while if the volume ratio of the portion is more than 50%, an inconvenience from the practical viewpoint, for example, a lack of torque may occur when the magnet is used for a rotor to be assembled in a motor. The portion oriented in directions tilted at 30° or more from radial directions is preferably in a range of 5 to 40%, more preferably, 10 to 40%.

The remaining portion of the magnet, which is in a range of 50 to 98%, preferably, 60 to 95% on the basis of the total volume of the magnet, is oriented in radial directions or in directions tilted at less than 30° from radial directions.

Figure 1A:
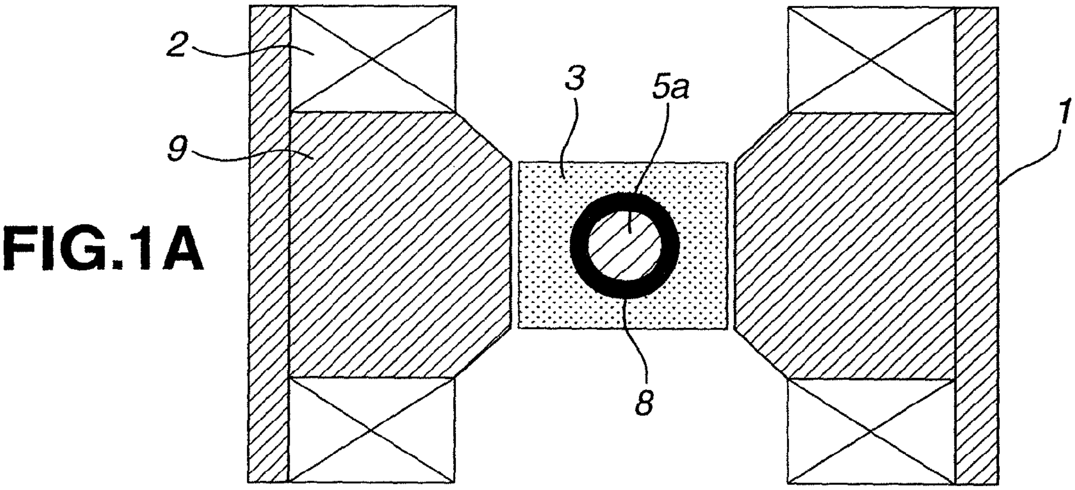
FIGS. 1A and 1B are a plan view and a vertical sectional view, illustrating one embodiment of a horizontal-field vertical molding machine used for producing cylindrical magnets, respectively.
Figure 1B:
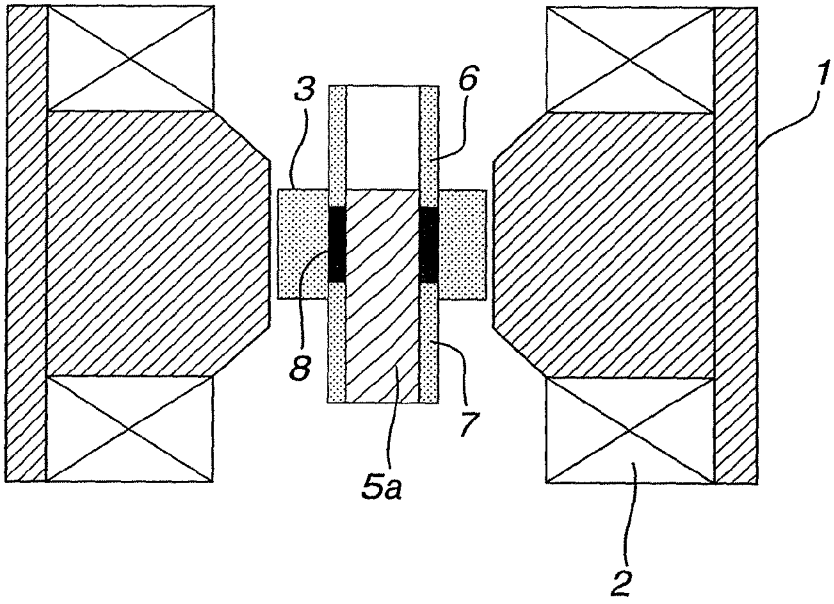

FIGS. 1A and 1B are views illustrating a horizontal-field vertical molding machine used for orientating a cylindrical magnet, particularly, a cylindrical magnet for a motor in a magnetic field at the time of molding of the cylindrical magnet. Like FIGS. 2A and 2B, reference numeral 1 denotes a molding machine base, 2 is an orientation magnetic field coil, 3 is a die, 5*a* is a core, 6 is an upper punch, 7 is a lower punch, 8 is a packed magnet powder, and 9 is a pole piece.

According to the present invention, at least part of, preferably, the whole of the core 5*a* is made from a ferromagnetic body having a saturated magnetic flux density of 5 kG or more, preferably, 5 to 24 kG, more preferably, 10 to 24 kG. The ferromagnetic body used for the core is made from a ferromagnetic material such as an Fe based material, a Co based material, or an alloy thereof.

Figure 3A:
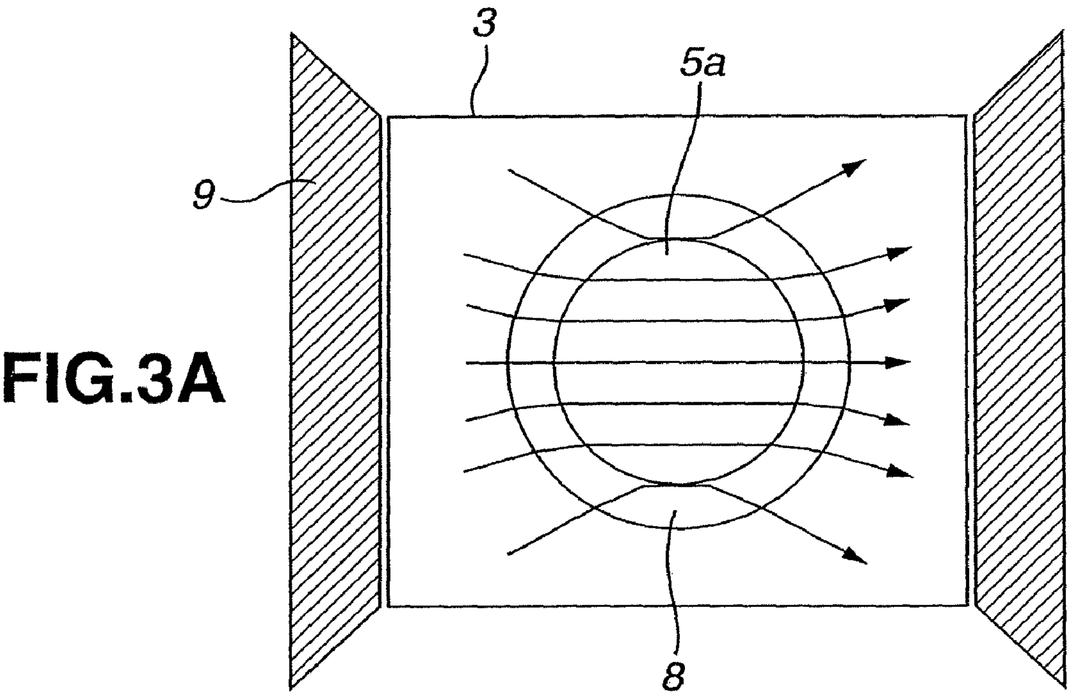
FIG. 3A is a schematic view illustrating a state of lines of magnetic force at the time of generation of a magnetic field by the horizontal-field vertical molding machine according to the present invention used for producing cylindrical magnets.
Figure 3B:
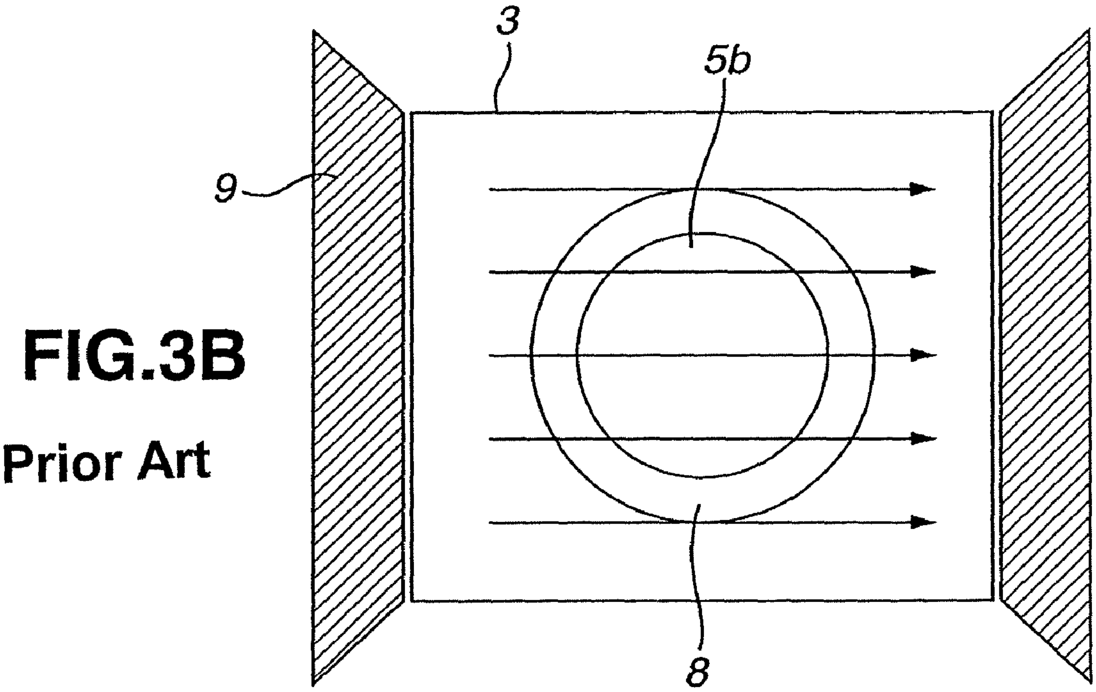
FIG.3B Prior Art
FIG. 3B is a schematic view illustrating a state of lines of magnetic force at the time of generation of a magnetic field by a related art horizontal-field vertical molding machine used for producing cylindrical magnets.

In the case of using the core formed by a ferromagnetic body having a saturated magnetic flux density of 5 kG or more, when an orientation magnetic field is applied to a magnet powder, magnetic fluxes tend to perpendicularly enter the ferromagnetic body, to depict lines of magnetic force in directions close to radial directions. Accordingly, as shown in FIG. 3A, which illustrates a horizontal-field vertical molding machine according to the present invention, the directions of the lines of magnetic force passing through the packed magnet powder can be made close to radial directions. On the contrary, according to a related art horizontal-field vertical molding machine shown in FIG. 3B, in which a core 5*b* is all made from a non-magnetic material or a magnetic material having a saturated magnetic flux density similar to that of a magnet powder, lines of magnetic force are parallel to each other as shown in FIG. 3B, wherein at a portion near the center in the vertical direction, the lines of magnetic force extend in radial directions; however, at a portion nearer to the upper or lower side, the lines of magnetic force extend more obliquely from radial directions because they extend along the orientation magnetic field direction applied by a coil. Even in the case where the core is formed by a ferromagnetic body, if the saturated magnetic flux density of the core is less than 5 kG, the core is easily saturated, with a result that the lines of magnetic force become close to those shown in FIG. 3B, and since the saturated magnetic flux density of the core is equal to that of the packed magnet powder (saturated magnetic density of the magnet×packing ratio), the directions of the magnetic fluxes in the packed magnet powder and the ferromagnetic core become equal to the magnetic field direction applied by the coil.

Figure 4A:
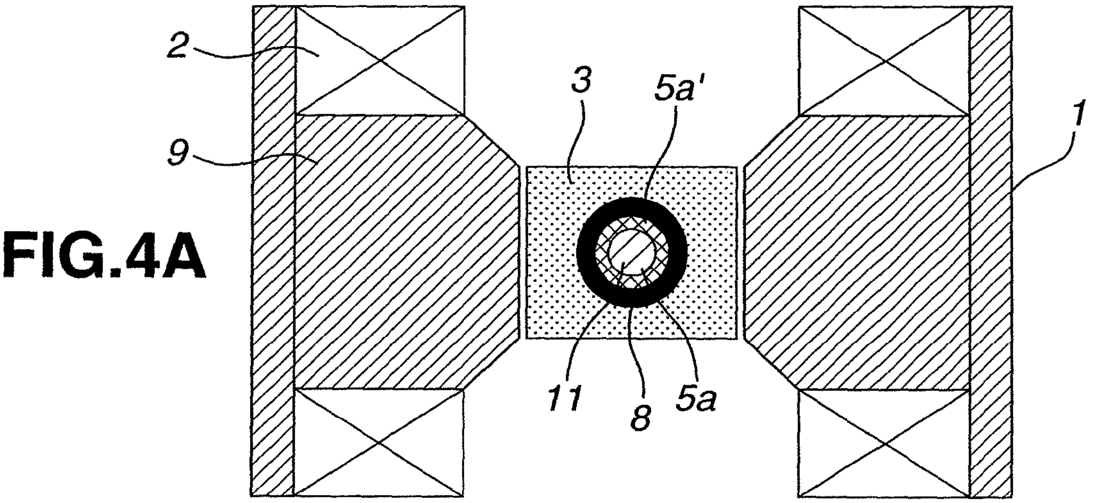
FIGS. 4A and 4B are a plan view and a vertical sectional view, illustrating another embodiment of the horizontal-field vertical molding machine used for producing cylindrical magnets, respectively.
Figure 4B:
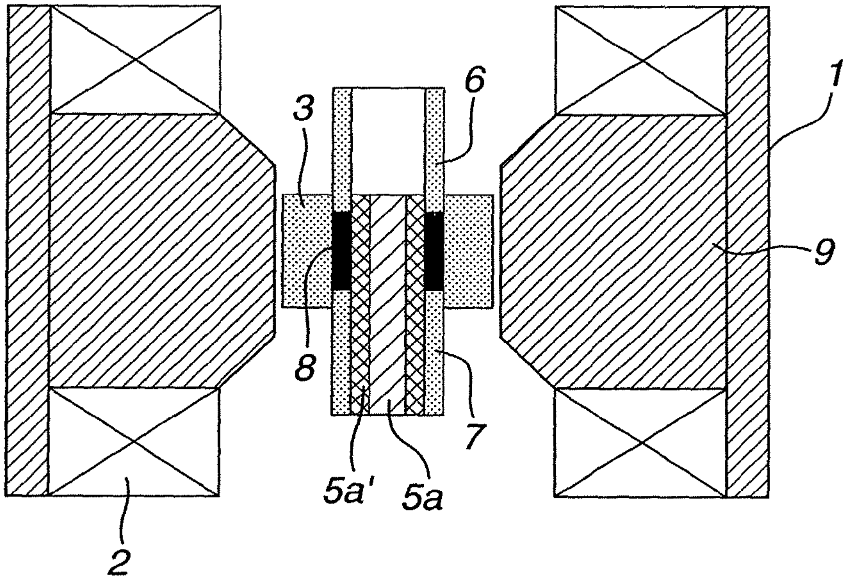

Even in the case of using a ferromagnetic body as part of the core, the same effect as that described above can be obtained; however, it may be preferred that the whole of the core be made from a ferromagnetic body. FIGS. 4A and 4B are views showing a modification of the core configuration in which a portion (central portion) of the core is formed by a ferromagnetic body and an outer peripheral portion of the core is formed by a weak ferromagnetic body made from a WC—Ni—Co based ferromagnetic material. In these figures, reference numeral 5*a*' denotes a weak ferromagnetic cemented carbide portion, and 11 denotes a magnetic material (Fe—Co—V alloy) called “Permendule”.

According to the above-described method, since the disturbance of magnetic orientations from radial directions in a cylindrical magnet occurs only in a portion perpendicular to an orientation magnetic field direction, it is possible to suppress, after magnetization, a reduction in magnetic fluxes at each magnetic pole at a slight amount, and hence to produce a cylindrical magnet for a motor rotor capable of preventing occurrence of unevenness and degradation of torque when the motor incorporated with the rotor is rotated.

At the time of the above-described horizontal-field vertical molding, the magnetic field generated by the horizontal-field vertical molding machine is preferably in a range of 5 to 12 kOe. The reason why the magnetic filed is specified as described above is as follows. If the magnetic field is more than 12 kOe, the core 5*a* shown in FIG. 3A is easily saturated, so that the directions of magnetic fluxes become close to those shown in FIG. 3B, with a result that a portion in the direction perpendicular to the magnetic field direction cannot be radially oriented. The use of the ferromagnetic core allows the magnetic fluxes to be concentrated at the core, so that a magnetic field larger than a coil generation magnetic field can be obtained near the coil. However, if the magnetic field is excessively small, it fails to obtain a magnetic field sufficient for orientation neat the core. Accordingly, the magnetic field is preferably in a range of 0.5 kOe or more. In addition, as described above, magnetic fluxes are concentrated near a ferromagnetic body, so that the magnetic field becomes large. Accordingly, the term “magnetic field generated by the horizontal-field vertical molding machine” used here means the value of a magnetic field at a location sufficiently apart from the ferromagnetic body, or the value of a magnetic field measured after removal of the ferromagnetic core. The magnetic field generated by the horizontal-field vertical molding machine is preferably in a range of 1 to 10 kOe.

Figure 2A:
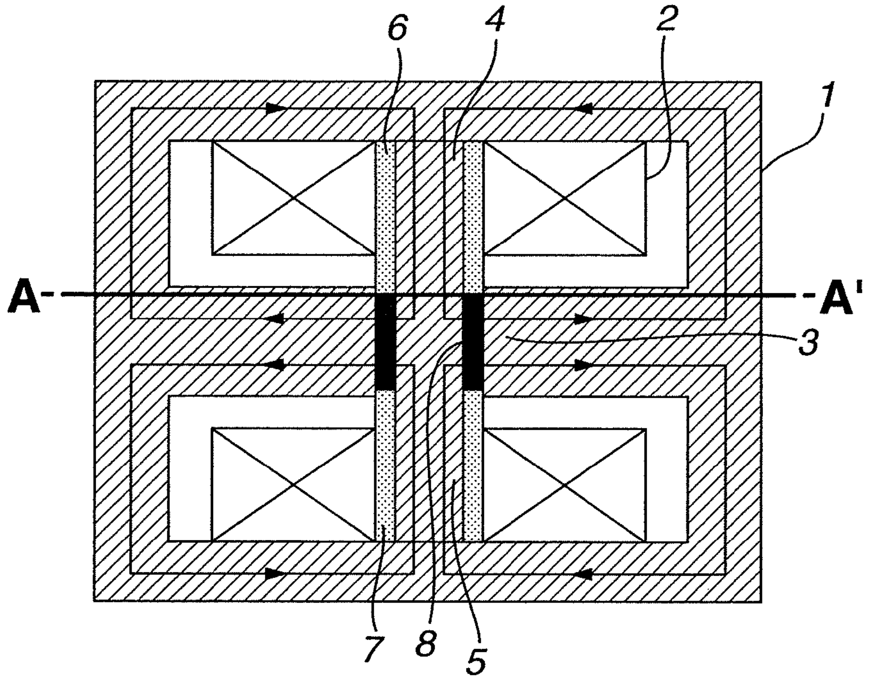
FIG. 2A is a vertical sectional view illustrating a related art vertical-field vertical molding machine used for producing radial anisotropic cylindrical magnets.
Figure 2B:
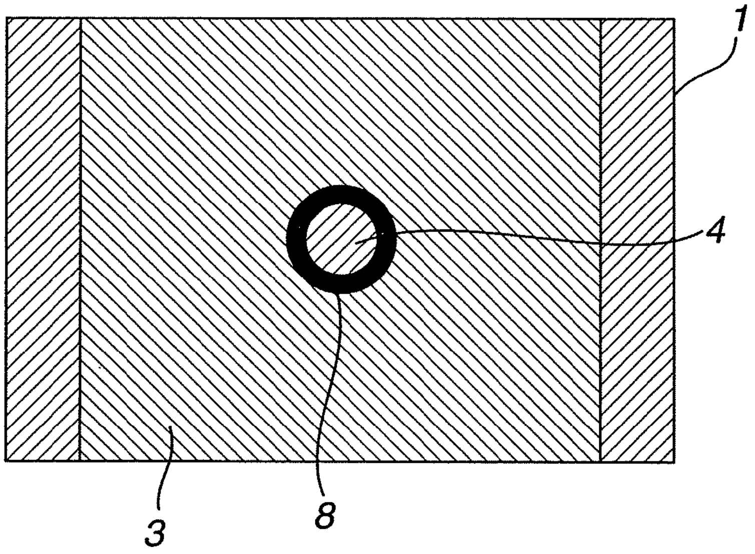
FIG. 2B is a sectional view taken on line A-A' of FIG. 2A.

In the vertical-field vertical molding machine as shown in FIGS. 2A and 2B, at least one non-magnetic body is provided in a die portion of a metal mold for molding a cylindrical magnet so as to be located in a region spread radially from the center of the metal mold at a total angle of 20° or more and 180° or less, particularly, 30° or more and 120° or less.

Figure 5A:
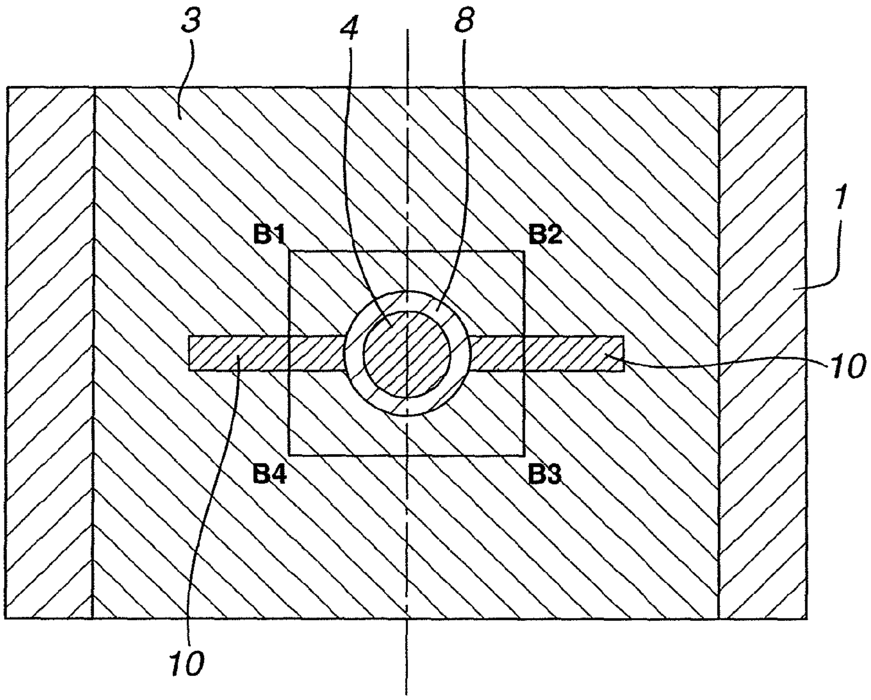
FIG. 5A is a sectional view, similar to that of FIG. 2B, illustrating a vertical-field vertical molding machine, in which non-magnetic materials are disposed in part of a die portion, used for producing radial anisotropic cylindrical magnets.
Figure 5B:
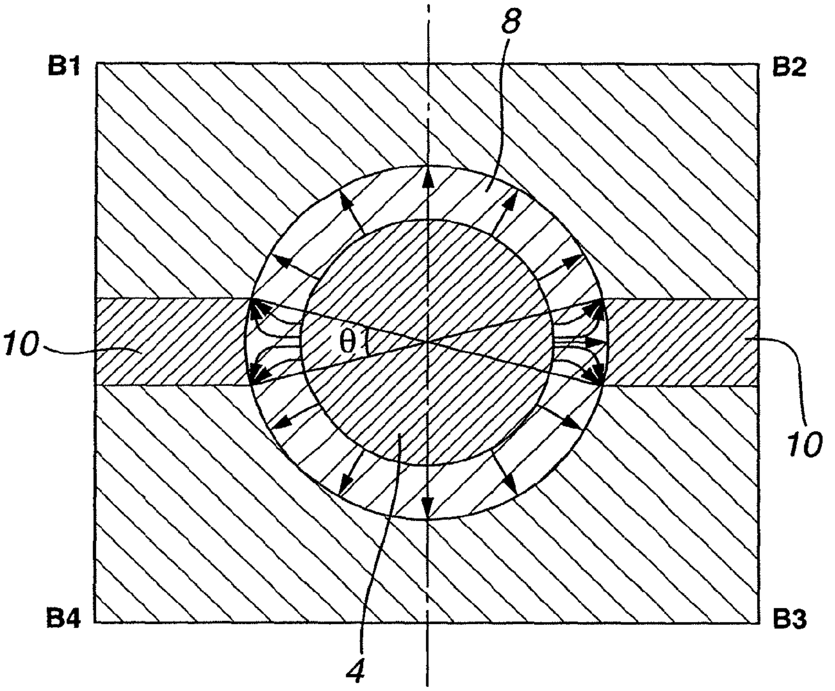
FIG. 5B is an enlarged sectional view of a portion surrounded by a line passing through points B1 to B4 in FIG. 5A.

FIGS. 5A and 5B are views showing a vertical-field vertical molding machine in which two pieces of non-magnetic bodies (for example, non-magnetic cemented carbides) 10 are symmetrically provided in a die portion of a metal mold for molding a radial anisotropic cylindrical magnet so as to be each located in a region spread at an angle θ=30° (which is 1/12 of the total region (spread at 360°) of the cylindrical die. In addition, near each non-magnetic body, lines of magnetic force are bent toward the ferromagnetic body, particularly, toward the edge of the ferromagnetic body present at the boundary between the ferromagnetic body and the non-magnetic body. Since a magnet powder is oriented in the directions of the bent lines of magnetic force, it is possible to a desirably oriented magnet. If the arrangement angle of the non-magnetic body is less than 20°, the effect of bending the lines of magnetic force is insufficient, and since a portion oriented in directions tilted at 30° or more from radial directions becomes small, so that the effect of preventing occurrence of cracks is degraded. On the other hand, if the arrangement angle of the non-magnetic body is larger than 180°, radial orientations of the magnet are disturbed, thereby failing to obtain a desirably oriented magnet.

In FIGS. 5A and 5B, the reference numeral 1 denotes the molding machine base, the reference numeral 3 denotes the die, the reference numeral 4 denotes the core, and the reference numeral 8 denotes the packed magnetic powder, as in FIGS. 2A and 2B.

The material for forming the die 3 other than the non-magnetic body is preferably a ferromagnetic body having a saturated magnetic flux density of 5 kG or more. The core is preferably formed from the ferromagnetic body having a saturated magnetic flux density.

In the case of preparing the metal mold having the core 5*a*, at least part or the whole of which is formed by a ferromagnetic body having a saturated magnetic flux density of 5 kG or more, and molding a magnet powder by the horizontal-field vertical molding process, a portion in the direction perpendicular to the direction of the orientation magnetic field applied from the coil may be often not radially oriented, although the above-described method is adopted. In the case where a ferromagnetic body is present in a magnetic field, magnetic fluxes, which tend to perpendicularly enter the ferromagnetic body, are attracted to the ferromagnetic body, so that the magnetic flux density is increased in the magnetic field direction of the ferromagnetic body and is decreased in the direction perpendicular thereto. As a result, in the case where a ferromagnetic core is disposed in a metal mold, a portion, in the magnetic field direction of the ferromagnetic core, of a packed magnet powder is sufficiently oriented by a strong magnetic field but a portion, in the direction perpendicular thereto, of the packed magnet powder is not oriented so much. To cope with such an inconvenience, according to the present invention, a magnet powder is rotated relative to a coil generation magnetic field. With this configuration, it is possible to orient again a portion having been imperfectly oriented by the strong magnetic field in the magnetic field applying direction, and hence to obtain a desirably oriented magnet.

To rotate a magnet powder relative to a coil generation magnetic field, there may be performed at least one of the following steps of:

(i) rotating, during the period in which the magnetic field is applied to the magnet powder, the magnet powder in the peripheral direction of the metal mold at a specific angle;

(ii) rotating, after the magnetic field is applied to the magnet powder, the magnet powder in the peripheral direction of the metal mold at a specific angle, and then applying a magnetic field again to the magnet powder;

(iii) rotating, during the period in which the magnetic field is applied to the magnet powder, a magnetic field generating coil relative to the magnet powder in the peripheral direction of the metal mold at a specific angle;

(iv) rotating, after the magnetic field is applied to the magnet powder, a magnetic field generating coil relative to the magnet powder in the peripheral direction of the metal mold at a specific angle, and then applying a magnetic field again to the magnet powder; and (v) disposing two pairs or more of magnetic field generating coils, and applying a magnetic field to the magnet powder by one pair of the magnetic field generating coils, and then applying a magnetic field to the magnet powder by another pair of the magnetic field generating coils.

The above step may be performed once or performed repeatedly by a plurality of times.

Figure 6:
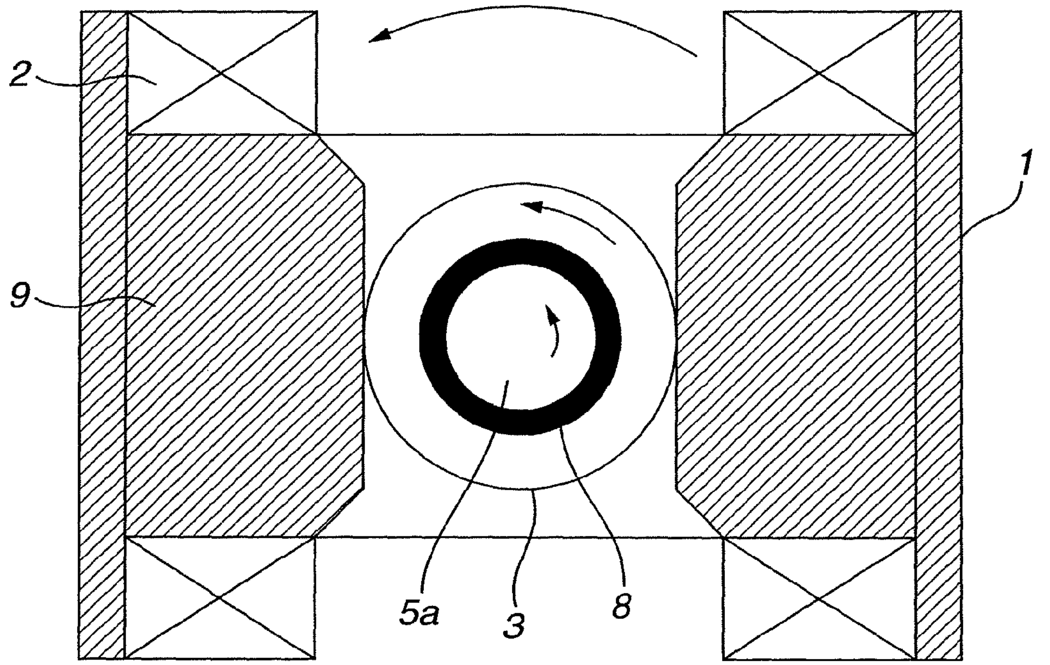
FIG. 6 is a view illustrating one example of a rotary type horizontal-field vertical molding machine used for producing cylindrical magnets.

With respect to the rotation of a packed magnet powder, as shown in FIG. 6, either of the coil 2, the core 5*a*, the die 3, and the punches 6 and 7 may be rotated relative to the direction of a coil generation magnetic field. In particular, in the case of rotating a packed magnet powder after a magnetic field is applied to the magnet powder, the residual magnetization of the ferromagnetic core or the magnet powder may be set to 50 G or more, particularly, 200 G or more. With this configuration, since a magnetic attracting force is generated between the magnet powder and the ferromagnetic core, the magnet powder can be rotated only by rotating the ferromagnetic core.

The rotational angle of a magnet powder may be suitably selected. Letting the initial position be 0°, the rotational angle is preferably set in a range of 10 to 170°, more preferably, 60 to 120°, particularly, at about 90°. In the case of rotating a magnet powder during a period in which a magnetic field is applied to the magnet powder, the magnet powder may be gradually rotated by a specific angle, and in the case of rotating the magnet powder after the magnetic field is applied to the magnet powder, the magnet powder is rotated by a specific angle and then a magnetic field is applied again to the magnetic field.

Other configuration of the vertical molding method of the present invention may be the same as those of an ordinary vertical molding method. That is to say, in accordance with the procedure of the ordinary vertical molding method, a magnet powder may be molded at a general molding pressure of 0.5 to 2.0 ton/cm$^2$ while an orientation magnetic field is applied to the magnet powder, followed by sintering, aging, machining, and the like, to obtain a sintered magnet.

The kind of a magnet powder used for the present invention is not particularly limited; however, the present invention is suitable to produce an Nd—Fe—B based cylindrical magnet, and is further effective to produce a ferrite magnet, an Sm—Co based rare earth magnet, and other bond magnets. In each case, an alloy powder having an average particle size of 0.1 to 100 μm, particularly, 0.3 to 50 μm may be used as the magnet powder.

Figure 7:
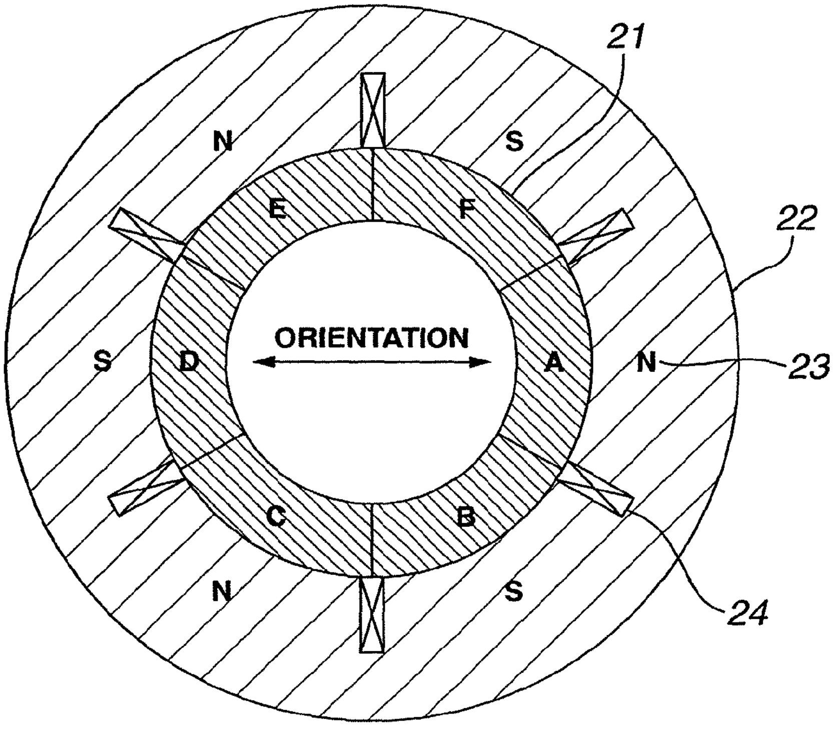
FIG. 7 is a typical view illustrating a state of magnetization of a cylindrical magnet using a magnetizer.

According to the present invention, an outer peripheral surface of a cylindrical magnet thus obtained is subjected to multipolar magnetization. FIG. 7 shows a state of magnetization of a cylindrical magnet 21 by using a magnetizer 22. In this figure, reference numeral 23 denotes a magnetic pole tooth of the magnetizer, and 24 denotes a coil of the magnetizer.

Figure 11:
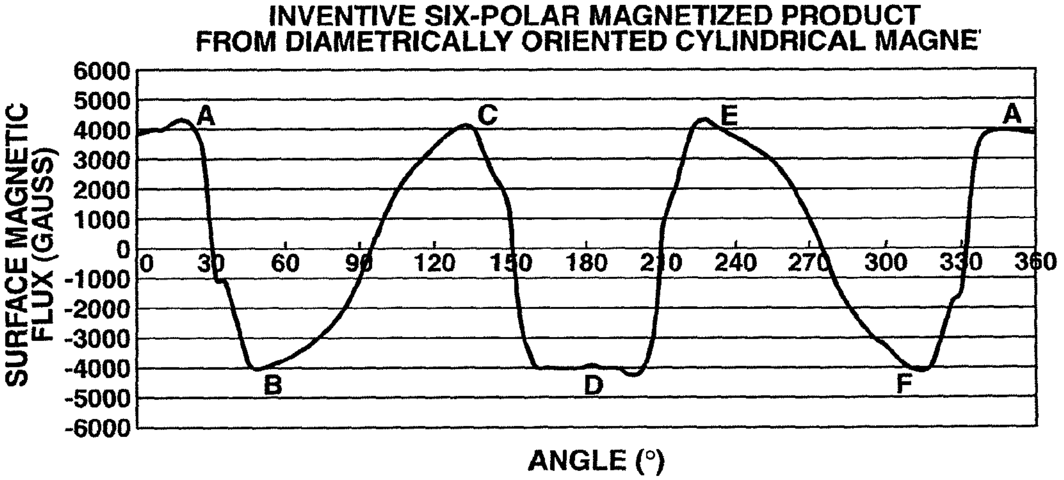
FIG. 11 is a diagram showing a magnetic flux density on the surface of an Nd—Fe—B based cylindrical magnet which is produced by the horizontal-field vertical molding machine according to the present invention and is then subjected to six-polar magnetization.
Figure 12:
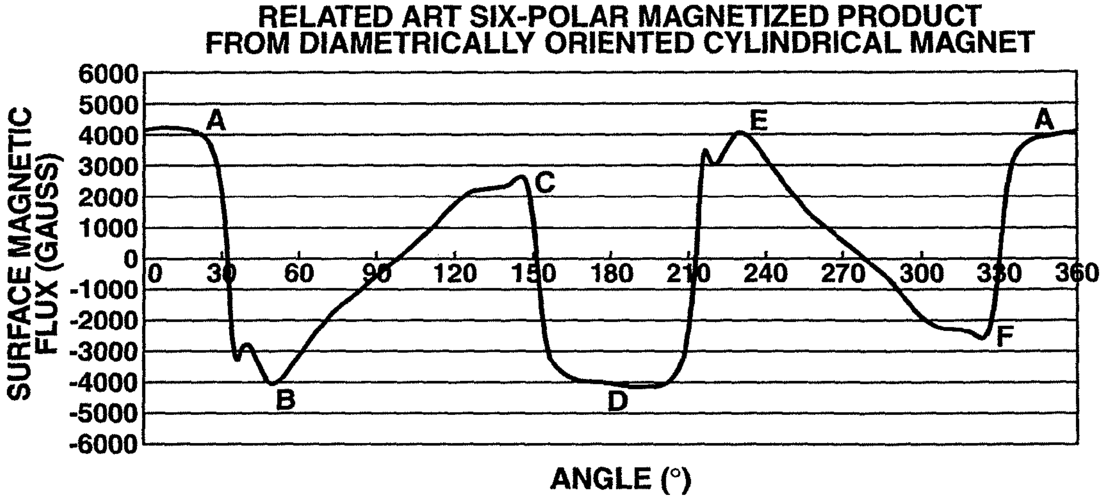
FIG. 12 is a diagram showing a magnetic flux density on the surface of an Nd—Fe—B based cylindrical magnet which is produced by the related art horizontal-field vertical molding machine using a non-magnetic material as a core and is then subjected to six-polar magnetization.

FIG. 11 shows a surface magnetic flux density of a six-polar magnetized cylindrical magnet, which is obtained by producing a radial-like diametrically oriented cylindrical magnet by the horizontal-field vertical molding method of the present invention, and subjecting the cylindrical magnet to six-polar magnetization by the magnetizer shown in FIG. 7. FIG. 12 shows a surface magnetic flux density of a six-polar magnetized cylindrical magnet, which is obtained by producing a diametrically oriented cylindrical magnet by the related art horizontal-field vertical molding method, and subjecting the cylindrical magnet to six-polar magnetization by the magnetizer shown in FIG. 7.

As a result of producing a diametrically oriented cylindrical magnet by the related art horizontal-field vertical molding machine, and subjecting the cylindrical magnet to six-polar magnetization such that the orientation magnetic direction is determined as a direction from an N-pole or an S-pole to the S-pole to the N-pole, it is found that at each of portions A and D in the orientation direction, the surface magnetic flux density is large, while at each of portions B, C, E, and F in directions close to a direction tilted at 90° from the orientation direction, the surface magnetic flux density is small, and that the magnetization width largely differs depending on the direction tilted from the orientation magnetic field direction, although magnetization is performed by using the magnetizer including the magnetized teeth having the same angular width. On the contrary, according to the present invention, as shown in FIG. 11, peak values of portions B, C, E, and F are increased up to those of portions A and D, and also the magnetization widths at portions where the surface magnetic flux is zero are nearly equalized. However, the surface magnetization curves of the portions B, C, E, and F are each sharpened at the peak position as compared with those of the portions A and D. Since the magnetic flux amount becomes large with the increased peak area, the magnetic flux amount of each of the portions B, C, E, and F becomes smaller than that of each of the portions A and D. When a motor incorporated with the magnet is rotated, the variation in magnetic flux between magnetic poles causes uneven rotation, leading to occurrence of vibration and noise. In other words, by reducing the variation in magnetic flux amount between magnetic poles, it is possible to realize the smooth rotation of the motor incorporated with the magnet.

Figure 10:
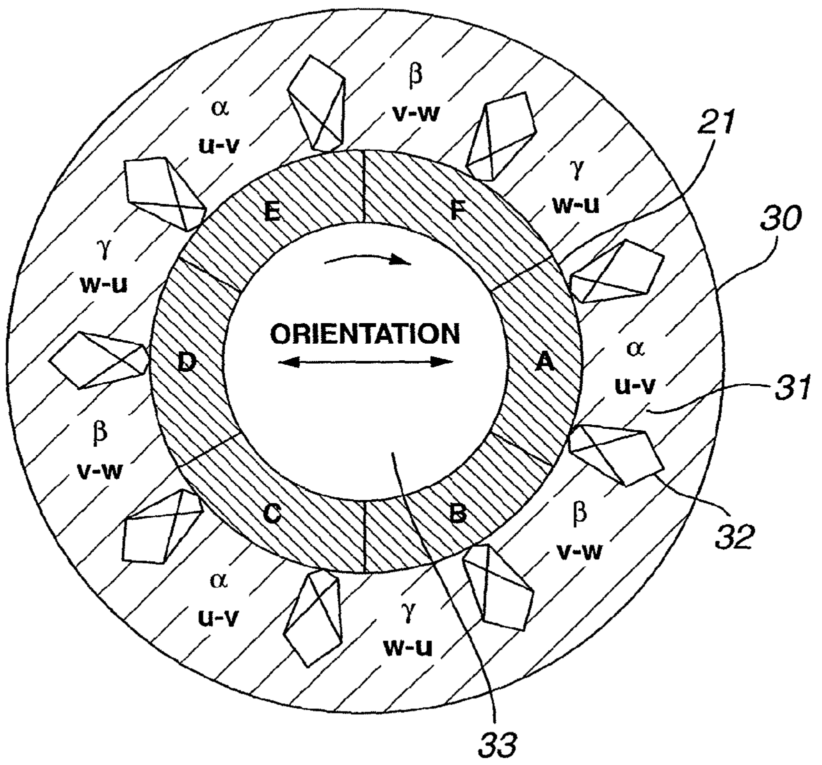
FIG. 10 is a plan view of a three-phase motor in which a six-polar magnetized cylindrical magnet is combined with nine teeth of a stator.

FIG. 10 is a plan view showing a three-phase motor having nine pieces of stator teeth. In a three-phase motor 30, three stator teeth (α) 31, three stator teeth (β) 31, and three stator teeth (γ) 31 are arranged in the order of α, β, and γ, and wiring as an input line of the motor is continuously wound around each of the stator teeth in the form of a coil 32, to thus form U, V, and W phases. By applying a current to the U, V, and W phases so as to allow the coils 32 to generate magnetic fields, the motor is rotated by repulsive forces and attracting forces acting between the magnetic fields generated by the coils 32 and the cylindrical magnet 21. To be more specific, the three stator teeth (α) 31, each of which is a U-V phase region, occupy one-third the total stator teeth, and accordingly, when a current flows between the U and V phases, magnetic fields are generated from the three stator teeth (α) 31. The same is true for the three stator teeth (α) 31, each of which is a V-W phase region, occupy one-third the total stator teeth, and for the three stator teeth (γ) 31, each of which is a W-U phase region, occupy one-third the total stator teeth. In the three-phase having the nine stator teeth shown in FIG. 10, the diametrically oriented cylindrical magnet 21 having been subjected to six-polar magnetization is assembled. In the figure, reference numeral 33 denotes a shaft of the motor rotor.

In the figure, the three stator teeth (α) 31, each of which is the U-V phase region, are located at the reference positions of the magnet, where the peak of a motor torque appears. In this case, the magnetic poles A, C and E act on the three stator teeth (α) 31, to form a rotational force. Of these magnetic poles, the magnetic pole A is located in the orientation magnetic field direction and has a large magnetic flux density, and each of the magnetic poles C and E is located in a direction offset from the orientation magnetic field direction and has a small magnetic flux amount. As the magnet is rotated, the magnetic poles D, F and B become close to the U-v (α) regions. The magnetic pole D is located in the orientation magnetic field direction and has a large magnetic flux density, and each of the magnetic poles F and B is located in a direction offset from the orientation magnetic field direction and has a small magnetic flux amount. However, since the number of the stator teeth is as large as 3/2 times the number of the magnetic poles of the magnet, the total amount of the magnetic fluxes of the magnetic poles A, C and E, crossing the coils of the U-V (α) regions is usually equal to the total amount of the magnetic fluxes of the magnetic poles D, F and B, crossing the coils of U-V (α) regions. The same is true for the V-W (β) regions and the W-U (γ) regions.

In this case, assuming that the number of magnetic poles of a cylindrical magnet is k (k: positive even number of 4 or more), the number of teeth of a stator to be combined with the cylindrical magnet) may be set to $3k\cdot j/2$ (j: positive integer of 1 or more). In the above case, the cylindrical magnet having the magnetic poles of the number k=6 is combined with the stator including the teeth of the number $3k\cdot j/2=9$. With this configuration, even in the case of using a cylindrical magnet including magnetic poles in an orientation magnetic field direction and magnetic poles offset from the orientation magnetic field direction, wherein a variation in magnetic flux amount between the magnetic poles is present, it is possible to realize a motor capable of moderating the variation in magnetic flux amount between the magnetic poles of the magnet, thereby eliminating uneven rotation. In addition, the above variable k is an even number being preferably in a range of 50 or less, more preferably, 40 or less, and the variable j is an integer being preferably in a range of 10 or less, more preferably, 5 or less. If the number k of magnetic poles is excessively large, the width of one of the magnetic poles becomes excessively small, to cause an inconvenience that the magnetic poles may be often not distinguished from each other in a direction perpendicular to the orientation magnetic field direction.

In the case where the number of magnetic poles of a magnet is set to 2n (n: positive integer in a range of 2 or more and 50 or less) and the number of teeth of a stator is set to 3m (m: positive integer in a range of 2 or more and 33 or less), the relationship between the number of the magnetic poles and the number of the stator teeth satisfies the above-described relationship, and the motor having the stator combined with the magnet specified as described above is advantageous in eliminating uneven rotation. It is to be noted that in the above relationship, the variables 2n and 3m must satisfy a relationship of $2n\neq 3m$. In particular, a motor having a stator combined with a multipolar magnetized cylindrical magnet obtained by producing a diametrically oriented cylindrical magnet and subjecting the cylindrical magnet to multipolar magnetization, wherein the number of teeth of the stator is set to 3n times the number of magnetic poles of the cylindrical magnet, can exhibit excellent motor characteristics, particularly, excellent rotational characteristic without uneven rotation.

As compared with a multipolar magnetized cylindrical magnet obtained by subjecting a radial anisotropic ring-shaped magnet to multipolar magnetization a multipolar magnetized cylindrical magnet obtained by subjecting a cylindrical magnet produced according to the present invention to multipolar magnetization is advantageous in that since a magnetization characteristic and a magnetic characteristic near between magnetic poles are low, a change in magnetic flux density between the magnetic poles is smooth and thereby a cogging torque of a motor incorporated with the magnet is low; however, the cogging torque can be further reduced by skew magnetization of the cylindrical magnet or skewing of the stator teeth. If an skew angle of the cylindrical magnet or the stator teeth is less than 1/10 of a spanned angle of one of the magnetic poles of the cylindrical magnet, the effect of reducing the cogging torque by skew magnetization or skewing of the stator teeth is insufficient, while if it is more than 2/3 of the spanned angle of one of the magnetic poles of the cylindrical magnet, a reduction in torque of the motor becomes large. Accordingly, the skew angle is preferably set in a range of 1/10 to 2/3, particularly, 1/10 to 2/5 of the spanned angle of one of the magnetic poles of the cylindrical magnet.

It is to be noted that other configurations of the permanent magnet motor according to the present invention may be the same as the known configurations of an ordinary permanent magnet motor.

Figure 8:
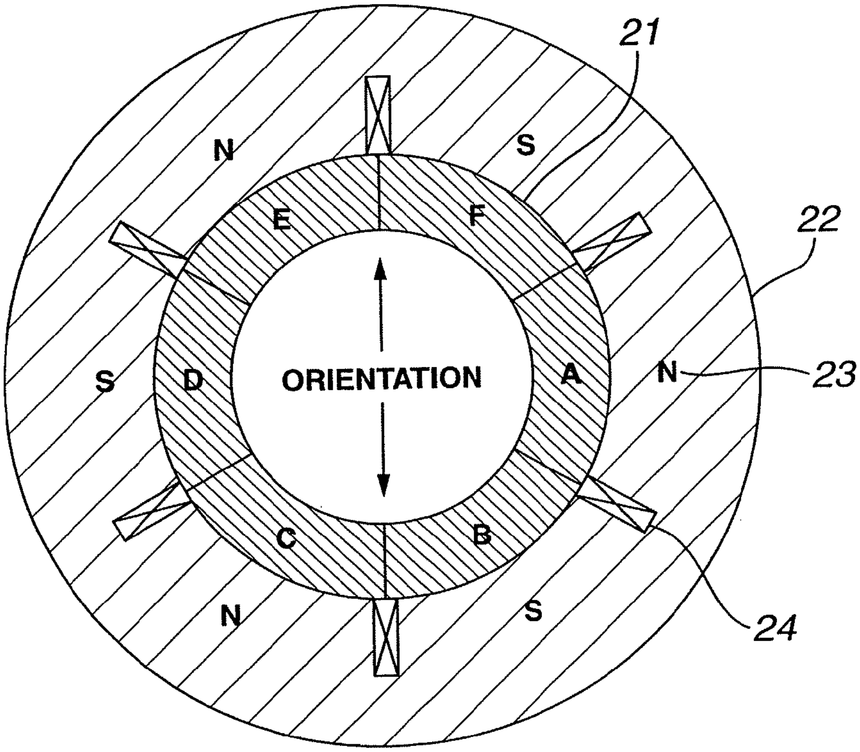
FIG. 8 is a typical view illustrating a state of magnetization of a cylindrical magnet using the magnetizer, wherein an orientation direction of the cylindrical magnet is turned relative to that of the cylindrical magnet shown in FIG. 7 by an angle of 90°.
Figure 9:
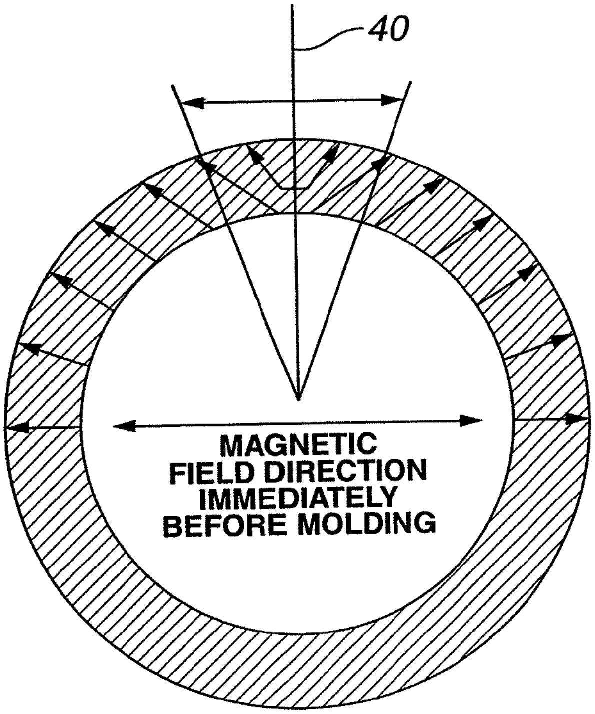
FIG. 9 is a plan view illustrating a boundary of an N-pole and an S-pole of a cylindrical magnet.

FIG. 7 is a typical view showing a state of magnetization performed with the orientation direction of a cylindrical magnet turned from that shown in FIG. 8 by 90°. In this case, as shown in FIG. 9, a reference boundary between an N-pole and an S-pole of the cylindrical magnet is preferably located in a region offset at an angle within ±10° from the center 40 of a portion oriented in directions tilted at an angle of 30° or more from radial directions, and the cylindrical magnet may be subjected to multipolar magnetization in the peripheral direction in such a manner that the other boundaries between the N-poles and S-poles be spaced from each other at equal intervals on the basis of the above reference boundary between the N-pole and S-pole. On the other hand, as compared with the magnetization shown in FIG. 8, the magnetization shown in FIG. 7 is characterized in that the cogging is eliminated and thereby the torque is increased because the portion not radially oriented is spared by four magnetic poles (two magnetic poles on each side).

FIG. 8 is a typical view showing a state of magnetization performed with the orientation direction of a cylindrical magnet turned from that shown in FIG. 7 by 90°. In this case, the cylindrical magnet is subjected to six-polar magnetization. Each of magnetic poles B, C, E, and F near the orientation direction has a relatively large magnetic flux amount, while each of magnetic poles A and D in a direction perpendicular to the orientation direction has a small magnetic flux amount. Here, a rotor magnet for a motor is prepared by stacking the cylindrical magnets magnetized as shown in FIGS. 7 and 8 in two stages in such a manner that the magnets are offset from each other by 90°. In this case, the total of the large magnetic flux amounts of the magnetic poles A and D of the magnet shown in FIG. 7 and the small magnetic flux amounts of the magnetic poles A and D of the magnet shown in FIG. 8 becomes nearly equal to the total of the small magnetic amounts of the magnetic poles B, C, E, and F of the magnet shown in FIG. 7 and the relatively large magnetic flux amounts of the magnetic poles B, C, E and F of the magnet shown in FIG. 8. As a result, it is possible to reduce a variation in magnetic flux amount between the magnetic poles, and hence to realize an excellent rotational characteristic without uneven rotation.

Similarly, a radial-like oriented cylindrical magnet produced by the horizontal-field vertical molding machine is equally divided into two parts in the axial direction of the magnet, and the two-divided magnet parts are stacked to each other. The stack of the two-divided magnetic parts is initially magnetized at the state shown in FIG. 7, being magnetized with the one of the two-divided magnet parts gradually turned up to 90° relative to the other, and finally magnetized in the state shown in FIG. 8. The cylindrical magnet may be of course equally divided into a plurality of parts. In this case, as the rotational angle is increased, the total of the magnetic fluxes of the magnetic poles A and D is decreased, while the total of the magnetic fluxes of the magnetic poles B, C, E and F is increased.

In this way, by stacking a plurality of radial-like diametrically oriented cylindrical magnets produced by the horizontal-field vertical molding machine to each other in such a manner that the magnets are offset from each other, and subjecting the stack of the cylindrical magnets to multipolar magnetization, it is possible to reduce a variation in magnetic flux mount between magnetic poles of a rotor composed of the stack of the cylindrical magnets, and hence to suppress uneven torque of a motor incorporated with the rotor. The upper limit of the stacked number of cylindrical magnets is not particularly restrictive but may be set to about 10.

As described above, by stacking a plurality of cylindrical magnets in two or more stages in such a manner that the orientation direction of each of the cylindrical magnet is relatively rotated at a specific angle, and subjecting the cylindrical magnets to multipolar magnetization, it is possible to reduce a variation in magnetic flux amount between a portion in the orientation direction and a portion in a direction perpendicular thereto, and hence to reduce a variation in magnetic flux amount between magnetic poles of a rotor composed of the stack of the cylindrical magnets. In this case, the cylindrical magnets may be stacked in such a manner that the orientation direction of each of the magnets be offset by an angle of 180°/i (i: the number of the stacked cylindrical magnets), and then be subjected to multipolar magnetization.

In addition, the number i of stacked cylindrical magnets may be set to i=n/2 (n: number of magnetic poles). In this case, a portion having a large magnetic flux amount located in the orientation direction and a portion having a small magnetic flux amount located in a direction perpendicular thereto can be equally distributed in each of the magnetic poles. As a result, by stacking the cylindrical magnets of the number i to each other in such a manner that the magnets are offset by an angle of 180°/I, and subjecting the cylindrical magnets to multipolar magnetization, the total magnetic flux amount of one of the magnetic poles can be made equal to that of another.

The variable n is a positive integer in a range of 40 to 50. If the variable n is excessively large, a space between magnetized poles becomes excessively narrow and thereby it is difficult to perform desirable magnetization. In this regard, the variable n is preferably in a range of 4 to 30.

The variable i is a positive integer in a range of 2 to 10. If the variable i is excessively large, that is, the number of stacked magnets becomes excessively large, the cost becomes high. In this regard, the variable i is preferably in a range of 2 to 6.

As compared with a multipolar magnetized cylindrical magnet obtained by subjecting a radial anisotropic ring-shaped magnet to multipolar magnetization, a multipolar magnetized cylindrical magnet obtained by producing a cylindrical magnet oriented in one direction by the horizontal-field vertical molding machine and subjecting the cylindrical magnet to multipolar magnetization is advantageous in that since a magnetization characteristic and a magnetic characteristic near between magnetic poles are low, a change in magnetic flux density between the magnetic poles is smooth and thereby a cogging torque of a motor incorporated with the magnet is low. In addition, the cogging torque can be further reduced by skew magnetization of the cylindrical magnet or skewing of the stator teeth.

If an skew angle of the cylindrical magnet or the stator teeth is less than 1/10 of a spanned angle (360°/n) of one of the magnetic poles of the cylindrical magnet, the effect of reducing the cogging torque by skew magnetization or skewing of the stator teeth is insufficient, while if it is more than 2/3 of the spanned angle of one of the magnetic poles, a reduction in torque of the motor becomes large. Accordingly, the skew angle is preferably set in a range of 1/10 to 2/3 of the spanned angle of one of the magnetic poles of the cylindrical magnet.

The permanent magnet type motor according to the present invention may be configured as shown in FIG. 10, in which the above-described multistage long-sized multipolar magnetized cylindrical magnet rotor be assembled in the motor including a stator having a plurality of teeth. In this case, the configuration of the motor including the stator having a plurality of teeth may be the same as the known configuration.

The radial anisotropic sintered magnet according to the present invention has excellent magnet characteristics without occurrence of cracks in the steps of sintering and cooling for aging, even if the magnet has a shape of a small ratio of an inner diameter and an outer diameter.

EXAMPLES

The present invention will be hereinafter more fully described by way of Examples and Comparative Examples, which are, however, not intended to limit the scope of the present invention.

Example 1

An ingot of an alloy of $Nd_{29}Dy_{2.5}Fe_{64}CO_{3}B_{1}Al_{0.2}Cu_{0.1}Si_{0.2}$ was produced by melting neodymium (Nd), dysprosium (Dy), iron (Fe), cobalt (Co), aluminum (Al), silicon (Si), and copper (Cu) each having a purity of 99.7 wt % and also boron (B) having a purity of 99.5 wt % in a vacuum melting furnace and casting the molten alloy into a mold. The ingot was coarsely crushed by a jaw crusher and a Braun mill and then finely pulverized in the flow of nitrogen gas by a jet mill, to obtain a fine powder having an average particle size of 3.5 μm.

The resultant fine powder was molded in a magnetic field of 8 kOe at a molding pressure of 0.5 $ton/cm^1$ by a horizontal-field vertical molding machine including a core made from a ferromagnetic material (steel: S50C specified under JIS) having a saturated magnetic flux density of 20 kG. At this time, a packing density of the magnet powder was 25%. The molded body was subjected to sintering in argon gas at 1,090° C. for one hour and then subjected to aging at 580° C. for one hour. The sintered body was machined into a cylindrical magnet having an outer diameter of 30 mm, an inner diameter of 25 mm, and a length of 30 mm.

The cylindrical magnet was subject to six-polar magnetization by a magnetizer having a magnetizing configuration shown in FIG. 7. The cylindrical magnet thus magnetized was assembled in a stator including a configuration shown in FIG. 10 and having the same height as that of the magnet, to prepare a motor. A ferromagnetic core taken as a motor shaft was inserted in and fixed to the inner diameter side of the cylindrical magnet. A fine copper wire was wound around each of the stator teeth by 150 turns.

The motor was measured in terms of induced voltage and torque ripple as motor characteristics. The induced voltage at the time of rotation of the motor at 1,000 rpm was measured, and the torque ripple at the time of rotation of the motor at 1 to 5 rpm was measured by using a load cell. The results are shown in Table 1.

Example 2

A magnetized cylindrical magnet was obtained in the same procedure as that in Example 1, except that magnetization was performed by a magnetizer having a magnetizing configuration shown in FIG. 8. The cylindrical magnet thus obtained was then assembled in the stator shown in FIG. 10 in the same manner as that in Example 1, to prepare a motor.

The motor was measured in terms of induced voltage and torque ripple as motor characteristics. The results are shown in Table 1.

TABLE 1

| | Induced voltage [V] | Torque ripple [Nm] |
|---|---|---|
| Example 1 (magnetization arrangement in FIG. 7) | 47 | 0.076 |
| Example 2 (magnetization arrangement in FIG. 8) | 43 | 0.182 |

Example 3

A magnetized cylindrical magnet was obtained in the same procedure as that in Example 1, except for the use of a core in which a ferromagnetic body (steel: SK5 specified in JIS, saturated magnetic flux density: 18 kG) having a cross-sectional area being 60% of the total cross-sectional area of the core was disposed concentrically with the outer periphery of the core and a non-magnetic body was disposed in the remaining portion of the core. The cylindrical magnet thus obtained was assembled in the stator shown in FIG. 10 in the same manner as that in Example 1, to prepare a motor.

The motor was measured in terms of motor characteristics in the same manner as that in Example 1. The results are shown in Table 2.

Example 4

A magnetized cylindrical magnet was obtained in the same procedure as that in Example 1, except that the magnetic field generated at the time of molding performed by the same molding machine as that in Example 1 was set to 6 kOe. The cylindrical magnet thus obtained was assembled in the stator shown in FIG. 10 in the same manner as that in Example 1, to prepare a motor.

The motor was measured in terms of motor characteristics in the same manner as that in Example 1. The results are shown in Table 2.

Comparative Example 1

The same magnet powder as that in Example 1 was molded in a coil generation magnetic field of 20 kOe by using a vertical-field vertical molding machine shown in FIGS. 2A and 2B. In this in-field molding, after a packed magnet powder having a packing depth of 30 mm was molded in the magnetic field of 20 kOe, the molded body was moved down, and a packed magnet powder having the same packing depth of 30 mm was placed on the molded body and similarly molded in the magnetic field of 20 kOe. The molded body was subjected to sintering and aging in the same conditions as those in Example 1, to obtain a cylindrical magnet having an outer diameter of 30 mm, an inner diameter of 25 mm, and a length of 30 mm. The cylindrical magnet thus obtained was assembled in the stator shown in FIG. 10 in the same manner as that in Example 1, to prepare a motor.

The motor was measured in terms of motor characteristics in the same manner as that in Example 1. The results are shown in Table 2.

Comparative Example 2

A magnetized cylindrical magnet was obtained in the same procedure as that in Example 1, except that a non-magnetic material (non-magnetic cemented carbide material WC—Ni—Co) was used as a core material. The cylindrical magnet thus obtained was assembled in the stator shown in FIG. 10 in the same manner as that in Example 1, to prepare a motor.

The motor was measured in terms of motor characteristics in the same manner as that in Example 1.

The results are shown in Table 2.

Comparative Example 3

A magnetized cylindrical magnet was obtained in the same procedure as that in Example 1, except that a core made from a ferromagnetic material (magnetic cemented carbide material WC—Ni—Co) having a saturated magnetic flux density of 2 kG was assembled in the same molding machine as that in Example 1. The cylindrical magnet thus obtained was assembled in the stator shown in FIG. 10 in the same manner as that in Example 1, to prepare a motor.

The motor was measured in terms of motor characteristics in the same manner as that in Example 1. The results are shown in Table 2.

Example 5

A magnetized cylindrical magnet was obtained in the same procedure as that in Example 1, except that two non-magnetic bodies (non-magnetic cemented carbide material WC—Ni—Co) were symmetrically disposed in two regions of a die, each region being spread from the center of the die at an angle of 30°, that is, symmetrically disposed in a region of the die spread from the center of the die at a total angle of 60°. The cylindrical magnet thus obtained was assembled in the stator shown in FIG. 10 in the same manner as that in Example 1, to prepare a test rotor.

The motor was measured in terms of motor characteristics in the same manner as that in Example 1. The results are shown in Table 2.

With respect to the cylindrical magnets produced in Examples 1, 3, 4 and 5 and Comparative Examples 1, 2 and 3, the ratio of the volume of a portion oriented in directions tilted at an angle of 30° or more from radial directions to the total volume of each cylindrical magnet was calculated on the basis of observation using a polarization microscope. Further, 100 pieces of the cylindrical magnets were produced under each of the conditions specified in Examples 1, 3, 4 and 5 and Comparative Examples 1, 2 and 3, and the total number of cracks occurred in 100 pieces of the cylindrical magnets produced under each of the conditions specified in Examples 1, 3, 4 and 5 and Comparative Examples 1, 2 and 3 was measured. The results are shown in Table 2.

TABLE 2

| | Induced Voltage [V] | Torque Ripple [Nm] | Disturbance of 30° or more (volume %) | Number of cracks (pieces/ 100 pieces of magnets) |
|---|---|---|---|---|
| Example 1 | 47 | 0.076 | 37 | 0 |
| Example 3 | 44 | 0.069 | 42 | 0 |
| Example 4 | 52 | 0.082 | 30 | 0 |
| Example 5 | 43 | 0.06 | 17 | 2 |
| Comparative Example 1 | 50 | 0.077 | 2 | 82 |
| Comparative Example 2 | 35 | 0.053 | 66 | 0 |
| Comparative Example 3 | 37 | 0.064 | 58 | 0 |

From the results shown in Table 2, it becomes apparent that each of the magnets produced in Examples 1, 3, 4 and 5 is excellent as a motor magnet because of large electromotive force, small torque ripple, and no crack, and is effective for mass production.

Figure 13:
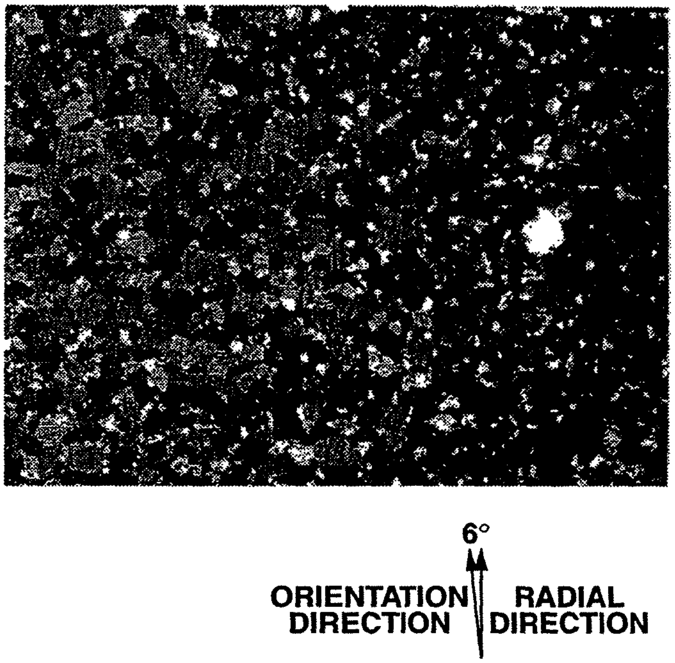
FIG. 13 is a microphotograph showing an orientation state of a cylindrical magnet at a point in a direction tilted at an angle of 30° from an orientation magnetic field applying direction, wherein the magnet is produced by a horizontal-field vertical molding machine using a ferromagnetic core.
Figure 14:
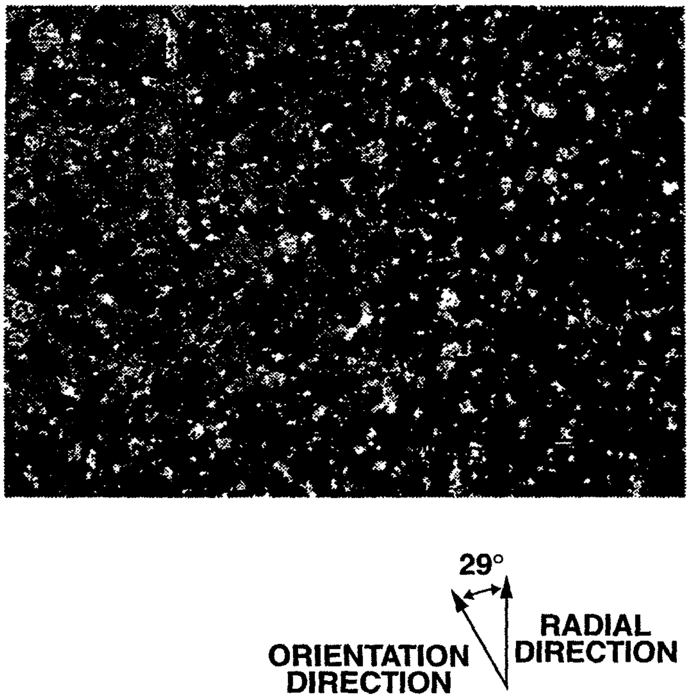
FIG. 14 is a microphotograph showing an orientation state of a cylindrical magnet at a point in a direction tilted at an angle of 60° from an orientation magnetic field applying direction, wherein the magnet is produced by a horizontal-field vertical molding machine using a ferromagnetic core.
Figure 15:
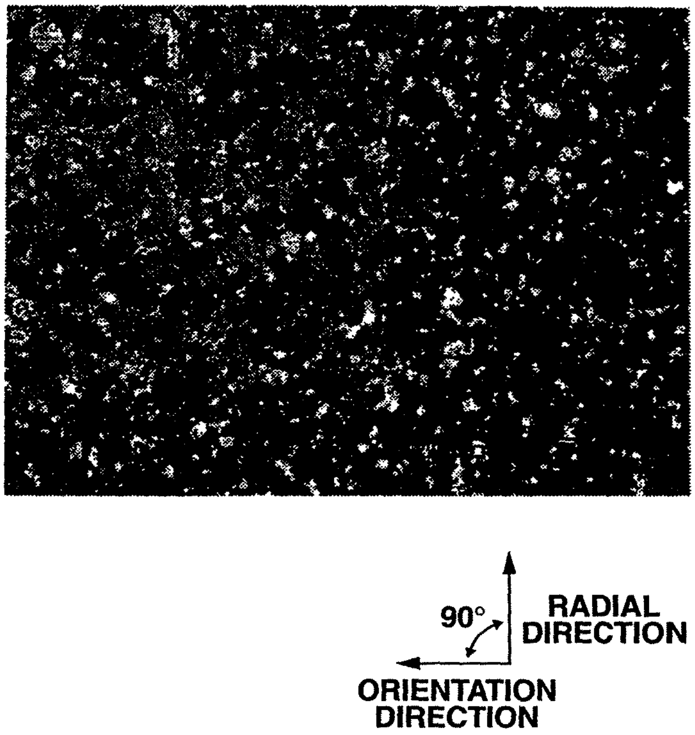
FIG. 15 is a microphotograph showing an orientation state of a cylindrical magnet at a point in a direction tilted at an angle of 90° from an orientation magnetic field applying direction, wherein the magnet is produced by a horizontal-field vertical molding machine using a ferromagnetic core.

FIGS. 13, 14 and 15 are microphotographs observed by the polarization microscope, showing the oriented states of the magnet at three points in the directions tilted at 30°, 60°, and 90° from the orientation magnetic field direction, respectively. The magnet used here is that produced under the condition in Example 4, that is, by the horizontal-field vertical molding machine using the ferromagnetic material as the core material. As shown in these figures, at the observed point in the direction tilted at 30° from the orientation magnetic field direction shown in FIG. 13, the oriented direction is tilted at 6° from the radial direction; at the observed point in the direction tilted at 60° from the orientation magnetic field direction shown in FIG. 14, the oriented direction is tilted at 29° from the radial direction; and at the observed point in the direction tilted at 90° from the orientation magnetic field direction shown in FIG. 15, the oriented direction is tilted at 90° from the radial direction. As a result, according to the cylindrical magnet of the present invention, at the point in the direction tilted at 60° from the orientation magnetic field direction, the oriented direction becomes tilted at about 30° from the radial direction. In other words, in the portion in the directions tilted at 60 to 90° from the orientation magnetic field direction (which portion is equivalent to 30 volume % of the total volume of the magnet), the orientation direction is tilted at 30° or more from the radial direction.

Examples 6 to 9, Reference Example 1

An ingot of an alloy of $Nd_{29}Dy_{2.5}Fe_{63.8}CO_3B_1Al_{0.3}Si_{0.3}Cu_{0.1}$ was produced by melting neodymium (Nd), dysprosium (Dy), iron (Fe), cobalt (Co), aluminum (Al), silicon (Si), and copper (Cu) each having a purity of 99.7 wt % and also boron (B) having a purity of 99.5 wt % in a vacuum melting furnace and casting the molten alloy into a mold. The ingot was coarsely crushed by a jaw crusher and a Braun mill and then finely pulverized in the flow of nitrogen gas by a jet mill, to obtain a fine powder having an average particle size of 3.5 μm.

The resultant fine powder was put in a die of a horizontal-field vertical molding machine including an iron-based ferromagnetic core having a saturated magnetic flux density of 20 kG as shown in FIGS. 1A and 1B, and was oriented in a coil generation magnetic field of 4 kOe, and in Example 6, the coil was rotated by 90°. The magnet powder was then oriented again in the same magnetic field of 4 kOe, and molded at a molding pressure of 1.0 ton/cm$^2$.

In Example 7, the fine powder was molded in the same procedure as that in Example 6, except that after the fine powder was oriented in the coil generation magnetic field of 4 kOe by the horizontal-field vertical molding machine, the die, core, and punch were rotated by 90°, and the fine powder was oriented again in the same magnetic field and molded at the molding pressing of 1.0 ton/cm$^2$.

In Example 8, the fine powder was molded in the same procedure as that in Example 6, except that after the fine powder was oriented in the coil generation magnetic field of 4 kOe by the horizontal-field vertical molding machine, the core with a residual magnetization of 4 kG was rotated by 90°, and the fine powder was oriented again in the same magnetic field of 4 kOe and molded at the molding pressure of 1.0 ton/cm$^2$. In this case, the residual magnetization of the magnet powder was 800 G.

The molded body in each of Examples 6, 7 and 8 was subjected to sintering in argon gas at 1,090° C. for one hour and then subjected to aging at 580° C. for one hour. The sintered body was machined into a cylindrical magnet having an outer diameter of 24 mm, an inner diameter of 19 mm, and a length of 30 mm.

In addition, a block magnet was prepared by molding the same magnet powder as that used for each of the cylindrical magnets in Examples 6 to 8 in a magnetic field of 12 kOe at a molding pressure of 1.0 ton/cm$^2$ by a horizontal-field vertical molding machine and subjecting the molded body to sintering in argon gas at 1,090° C. for one hour and to aging at 580° C. for one hour. The block magnet thus obtained had magnetic properties including Br of 12.5 kG, iHc of 15 kOe, and (BH) max of 36 MGOe.

Each of the cylindrical magnets produced in Examples 6 to 8 was subjected to six-polar skew magnetization with a skew angle of 20° by using the magnetizer shown in FIG. 7. The magnetized cylindrical magnet was assembled in the stator including the configuration shown in FIG. 10 and having the same height as that of the magnet, to prepare a motor.

Each motor was measured in terms of induced voltage and torque ripple as motor characteristics. The induced voltage at the time of rotation of the motor at 5,000 rpm was measured, and the torque ripple at the time of rotation of the motor at 5 rpm was measured by using a load cell. As Example 8a, a cylindrical magnet produced by conducting the molding, sintering and heat treating (aging) steps in the same manner as in Example 8 was subjected to six-polar skew magnetization with a skew angle of 20° by using a magnetizer shown in FIG. 8. The magnetized cylindrical magnet was assembled in the stator to prepare a motor in the same manner as above. The results are shown in Table 3. It is to be noted that the induced voltage is expressed by the maximum value of the absolute values of the measured induced voltages, and the torque ripple is expressed by a difference between the maximum value and the minimum value of the measured torque ripples.

In Example 9, a magnetized cylindrical magnet was obtained in the same procedure as that in Example 6, except that a magnet powder was put in the die of the same horizontal-field vertical molding machine as that in Example 6, and was oriented while being rotated in a magnetic field of 12 kOe and was molded at a molding pressure of 1.0 ton/cm$^2$. The cylindrical magnet thus obtained was assembled in the stator shown in FIG. 10 in the same manner as that in Example 6, to prepare a motor.

The motor was measured in terms of motor characteristics in the same manner as that in Example 6. The results are shown in Table 3.

In Reference Example 1, a magnetized cylindrical magnet was obtained in the same procedure as that in Example 6, except that after a magnet powder was oriented in the magnetic field of 4 kOe in the same manner as that in Example 6, the magnet powder was molded in the magnetic field at a molding pressure of 1.0 ton/cm$^2$ without rotation of the magnet powder. The cylindrical magnet thus obtained was assembled in the stator shown in FIG. 10 in the same manner as that in Example 6, to prepare a motor.

The motor was measured in terms of motor characteristics in the same manner as that in Example 6. The results are shown in Table 3.

TABLE 3

| | Induced voltage (effective value) [mV/rpm] | Torque ripple [Nm] |
|---|---|---|
| Example 6 | 18.7 | 8.7 |
| Example 7 | 18.6 | 8.7 |
| Example 8 | 18.7 | 8.7 |
| Example 8a | 16.2 | 10.3 |
| Example 9 | 18.4 | 12.8 |
| Reference Example 1 | 14.1 | 7.8 |

From the results shown in Table 3, it becomes apparent that as compared with the motor in Reference Example, each of the motors in Examples 6 to 9 is greatly improved in terms of induced voltage corresponding to the torque, and therefore, the method of producing a motor magnet according to the present invention is very desirable.

The result of measuring surface magnetic fluxes of the magnetized rotor magnet in Example 6 is similar to the result shown in FIG. 11. This shows that respective magnetic poles are equalized and the areas of the magnetic poles are large, and therefore, the rotor magnet in Example 6 is capable of uniformly generating large magnetic fields.

Example 10

An ingot of an alloy of $Nd_{29}Dy_{2.5}Fe_{64}CO_3B_1Al_{0.2}Si_{0.2}Cu_{0.1}$ was produced by melting neodymium (Nd), dysprosium (Dy), iron (Fe), cobalt (Co), aluminum (Al), silicon (Si), and copper (Cu) each having a purity of 99.7 wt % and also boron (B) having a purity of 99.5 wt % in a vacuum melting furnace and casting the molten alloy into a mold. The ingot was coarsely crushed by a jaw crusher and a Braun mill and then finely pulverized in the flow of nitrogen gas by a jet mill, to obtain a fine powder having an average particle size of 3.5 μm.

The resultant fine powder was molded in a magnetic field of 10 kOe at a molding pressure of 1.0 ton/cm$^2$ by a horizontal-field vertical molding machine, shown in FIG. 1, including an iron-based ferromagnetic core having a saturated magnetic flux density of 20 kG. The molded body was subjected to sintering in argon gas at 1,090° C. for one hour and then subjected to aging at 580° C. for one hour. The sintered body was machined into a cylindrical magnet having an outer diameter of 30 mm, an inner diameter of 25 mm, and a length of 30 mm.

In addition, a block magnet was prepared by molding the same magnet powder as that used in Example 10 in a magnetic field of 10 kOe at a molding pressure of 1.0 ton/cm$^2$ by a vertical-field pressing machine and subjecting the molded body to sintering in argon gas at 1,090° C. for one hour and to aging at 580° C. for one hour. The block magnet thus obtained had magnetic properties including Br of 13.0 kG, iHc of 15 kOe, and (BH)max of 40 MGOe.

The diametrically oriented cylindrical magnet was subjected to six-polar magnetization by a magnetizer. The cylindrical magnet thus magnetized was assembled in the stator (the number of stator teeth: 9) including a configuration shown in FIG. 10 and having the same height as that of the magnet, to prepare a motor. A ferromagnetic core taken as a motor shaft was inserted in and fixed to the inner diameter side of the cylindrical magnet. A copper fine wire was wound around each of the stator teeth by 100 turns. The magnetic flux amount between U and V phases of the motor was measured by using a flux meter. Peak values of the magnetic flux amounts during one revolution of the magnet are shown in Table 4.

Comparative Example 4

A motor was obtained in the same procedure as that in Example 10, except that the fine copper wire was wound around only one of the nine stator teeth by 100 turns. The magnetic flux amount between the U and V phases of the motor was measured by using the flux meter. Peak values of the magnetic flux amounts during one revolution of the magnet are shown in Table 4.

As shown in Table 4, in Comparative Example 4, the largest peak value of magnetic flux is as very large as about 1.5 times the smallest peak value of magnetic flux, whereas in Example 10, the largest peak value of magnetic flux is little different from the smallest peak value of magnetic flux.

Example 11

A motor was obtained in the same procedure as that in Example 10, except for a core in which a ferromagnetic body (saturated magnetic flux density: 18 kG) having a cross-sectional area being 60% of the total cross-sectional area of the core was disposed concentrically with the outer periphery of the core and a non-magnetic body was disposed in the remaining portion of the core. The magnetic flux amount between the U-V phases of the motor was measured by using the flux meter. Peak values of the magnetic flux amounts during one revolution of the magnet are shown in Table 4.

Comparative Example 5

A motor was obtained in the same procedure as that in Example 10, except that a non-magnetic body (non-magnetic cemented carbide material WC—Ni—Co) was used as the core material. The magnetic flux amount between the U-v phases of the motor was measured by using the flux meter. Peak values of the magnetic flux amounts during one revolution of the magnet are shown in Table 4.

Comparative Example 6

A motor was obtained in the same procedure as that in Example 10, except that a saturated magnetic flux density of an iron-based ferromagnetic core was set to 2 kG. The magnetic flux amount between the U-V phases of the motor was measured by using the flux meter. Peak values of the magnetic flux amounts during one revolution of the magnet are shown in Table 4.

TABLE 4

| | Peak 1 [kMx] | Peak 2 [kMx] | Peak 3 [kMx] | Peak 4 [kMx] | Peak 5 [kMx] | Peak 6 [kMx] |
|---|---|---|---|---|---|---|
| Example 10 | −38.2 | 38.3 | −38.5 | 38.7 | −38.6 | 38.4 |
| Example 11 | −36.9 | 36.7 | −36.5 | 36.9 | −37 | 36.7 |
| Comparative Example 4 | −41.2 | 27.5 | −26.8 | 40.8 | −27.1 | −26.7 |

TABLE 4-continued

| | Peak 1 [kMx] | Peak 2 [kMx] | Peak 3 [kMx] | Peak 4 [kMx] | Peak 5 [kMx] | Peak 6 [kMx] |
|---|---|---|---|---|---|---|
| Comparative Example 5 | −30.5 | 30.2 | −30.4 | 30.6 | −30.2 | 30.3 |
| Comparative Example 6 | −31.8 | 31.7 | −31.9 | 31.9 | −31.5 | 32 |

Example 12

The motor produced in Example 10 was measured in terms induced voltage and torque ripple as motor characteristics. The induced voltage at the time of rotation of the motor at 1,000 rpm was measured, and the torque ripple at the time of rotation of the motor at 1 to 5 rpm was measured by using a load cell. The results are shown in Table 5. It is to be noted that the induced voltage is expressed by the maximum value of the absolute values of the measured induced voltages and the torque ripple is expressed by a difference between the maximum value and the minimum value of the measured torque ripples. From the results shown in Table 5, it becomes apparent that the motor in Example 12 has an induced voltage amount sufficient for practical use and a sufficiently small torque ripple.

Example 13

A magnetized cylindrical magnet was obtained in the same manner as that in Example 10, except that a diametrically oriented cylindrical magnet was subjected to skew magnetization with a skew angle of 20° being equal to ⅓ of a spanned angle of one of magnetic poles of the magnet. The cylindrical magnet thus obtained was assembled in the stator shown in FIG. 10, to prepare a motor. The motor was measured in motor characteristics in the same manner as that in Example 12. The results are shown in Table 5. From the results shown in Table 5, it becomes apparent that the motor in Example 13 characterized by skew magnetization exhibits a torque ripple smaller than that of the motor in Example 12 characterized by non-skew magnetization, and exhibits an induced voltage slightly lower than that of the motor in Example 12 characterized by non-skew magnetization.

Reference Example 2

A magnetized cylindrical magnet was obtained in the same manner as that in Example 10, except that a diametrically oriented cylindrical magnet was subjected to skew magnetization with a skew angle of 50° being equal to ⅚ of a spanned angle of one of magnetic poles of the magnet. The cylindrical magnet thus obtained was assembled in the stator shown in FIG. 10, to prepare a motor. The motor was measured in motor characteristics in the same manner as that in Example 12. The results are shown in Table 5. From the results shown in Table 5, it becomes apparent that the motor in Reference Example 2 characterized by skew magnetization exhibits a torque ripple smaller than that of the motor in Example 12 characterized by non-skew magnetization, but exhibits an induced voltage very lower than that of the motor in Example 12 characterized by non-skew magnetization, and that the motor in Reference Example 2 may be undesirable from the practical use.

Example 14

A motor was obtained in the same manner as that in Example 10, except that a magnetized cylindrical magnet was inserted in the same stator as that used in Example 10 except stator teeth each having a skew angle of 20° being equal to ⅓ of a spanned angle of one of magnetic poles of the magnet. The motor was measured in terms of motor characteristics in the same manner as that in Example 12. The results are shown in Table 5. From the results shown in Table 5, it becomes apparent that the motor in Example 14 characterized by skew stator teeth exhibits a torque ripple smaller than that of the motor in Example 12 characterized by non-skew stator teeth, and exhibits an induced voltage slightly lower than that of the motor in Example 12 characterized by non-skew stator teeth.

TABLE 5

| | Induced voltage [V] | Torque ripple [Nm] |
|---|---|---|
| Example 12 | 60 | 0.08 |
| Example 13 | 55 | 0.021 |
| Example 14 | 54 | 0.027 |
| Reference Example 2 | 12 | 0.017 |

Example 15

An ingot of an alloy of $Nd_{29}Dy_{2.5}Fe_{64}CO_{3}B_{1}Al_{0.2}Si_{0.2}Cu_{0.1}$ was produced by melting neodymium (Nd), dysprosium (Dy), iron (Fe), cobalt (Co), aluminum (Al), silicon (Si), and copper (Cu) each having a purity of 99.7 wt % and also boron (B) having a purity of 99.5 wt % in a vacuum melting furnace and casting the molten alloy into a mold. The ingot was coarsely crushed by a jaw crusher and a Braun mill and then finely pulverized in the flow of nitrogen gas by a jet mill, to obtain a fine powder having an average particle size of 3.5 μm.

The resultant fine powder was molded in a magnetic field of 6 kOe at a molding pressure of 1.0 ton/cm$^2$ by the horizontal-field vertical molding machine, shown in FIGS. 1A and 1B, including an iron-based ferromagnetic core having a saturated magnetic flux density of 20 kG. The molded body was subjected to sintering in argon gas at 1,090° C. for one hour and then subjected to aging at 580° C. for one hour. The sintered body was machined into a cylindrical magnet having an outer diameter of 30 mm, an inner diameter of 25 mm, and a thickness of 15 mm.

The above procedure was repeated to prepare three pieces of the cylindrical magnets. These cylindrical magnets were stacked in three stages in such a manner that the orientation magnetic field direction of the lower magnet satisfied the relationship (magnetic pole A being taken as an N pole) shown in FIG. 8, and that the orientation magnetic field direction of the intermediate magnet was offset from that of the lower magnet by 60° and the orientation of the magnetic field direction of the upper magnet was offset from that of the intermediate magnet by 60°. The stack of these cylindrical magnets was then subjected to six-polar magnetization.

Example 16

The same procedure as that in Example 15 was repeated, except that the cylindrical magnets were stacked in two stages at the offset angle of 90°.

Reference Example 3

In this example, the stacking of magnets performed in Examples 15 and 16 was not performed. A cylindrical magnet having an outer diameter of 30 mm, an inner diameter of 25 mm, and a thickness of 30 mm was produced by using the same magnetic powder as that in Example 15 in accordance with the same procedure as that in Example 15, except that the height of the molded body was changed. The single cylindrical magnet was subjected to six-polar magnetization.

Example 17

Figure 16:
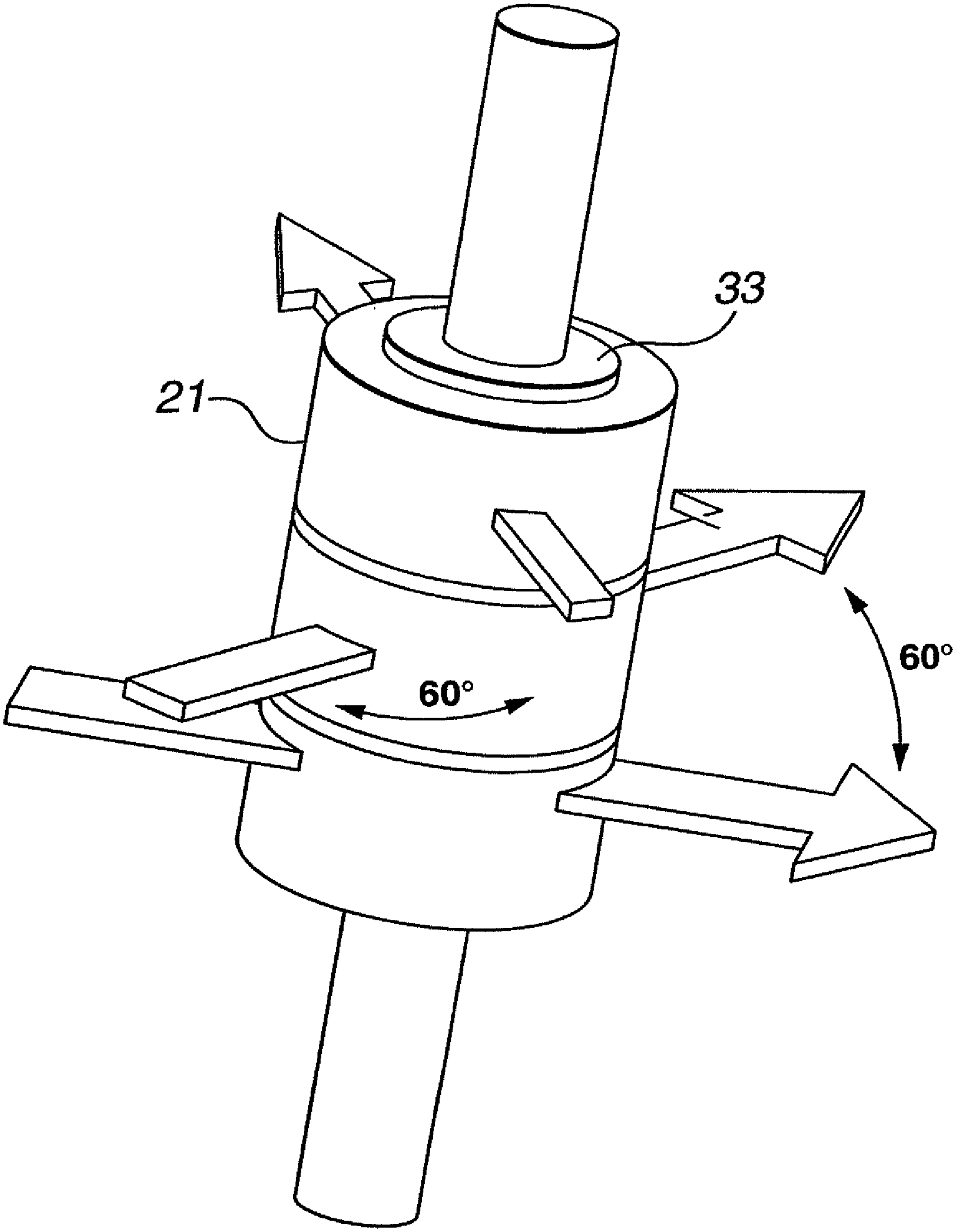
FIG. 16 is a perspective view of a rotor for a permanent magnet type motor according to the present invention, wherein diametrically oriented cylindrical magnets are stacked in three stages in such a manner as to be offset from each other by an angle of 60°.

Three pieces of cylindrical magnets, each having an outer diameter of 30 mm, and inner diameter of 25 mm, and a thickness of 10 mm, were produced by using the same magnetic powder as that used in Example 15 in accordance with the same procedure as that in Example 15. These cylindrical magnets were stacked in three stages in such a manner that the orientation magnetic field directions of the cylindrical magnets were sequentially offset from each other by 60° and that the orientation magnetic field direction of the cylindrical magnet in each stage satisfied the relationship shown in FIG. 7, and were subjected to six-polar magnetization. The magnetization state is shown in FIG. 16. In this figure, the orientation magnetic field direction of the cylindrical magnet in each stage is shown by a thick arrow. Reference numeral 33 denotes a shaft of a motor rotor.

To evaluate these magnets, a fine copper wire was wound by 50 turns into a rectangular shape (size: 10.5 mm×30 mm), to prepare a coil. The coil was moved from a position in direct contact with the cylindrical magnet to a position apart enough not to be affected by the magnetic force of the magnet, and the amount of magnetic fluxes crossing the coil was measured by using a flux meter disposed in the outer peripheral direction of the cylindrical magnet. Peak values of the magnetic fluxes are shown in Table 6.

TABLE 6

| | Peak 1 [kMx] | Peak 2 [kMx] | Peak 3 [kMx] | Peak 4 [kMx] | Peak 5 [kMx] | Peak 6 [kMx] |
|---|---|---|---|---|---|---|
| Example 15 (offset angle: 60°, stacked: three stages) | 10.17 | −11.03 | 13 | −10.15 | 11.1 | −13.12 |
| Example 16 (offset angle: 90°, stacked: two stages) | 11.5 | −10.71 | 11.45 | −11.42 | 10.66 | −11.44 |
| Example 17 (offset angle: 60°, stacked: three stages) | 12.01 | −11.95 | 11.96 | −12.04 | 11.99 | −11.98 |
| Reference Example 3 (no stacked) | 9.01 | −9.07 | 13.52 | −8.98 | 9.12 | −13.49 |

Examples 18 and 19, Reference Example 4, Comparative Example 7

FIG. 10 is a plan view showing a three-phase permanent magnet motor 30 having nine pieces of motor stator teeth 31. A magnetized cylindrical magnet was assembled in a stator having the same height as that of the magnet, to prepare a motor. A ferromagnetic core taken as a motor shaft was inserted in and fixed to the inner diameter side of the cylindrical magnet. A fine copper fine wire was wound around each of the teeth by 150 turns.

The motor was measured in terms of induced voltage and torque ripple as motor characteristics. The induced voltages at the time of rotation of the motor at 1,000 rpm was measured, and the torque ripple at the time of rotation of the motor at 1 to 5 rpm was measured by using a load cell. The results are shown in Table 7. It is to be noted that the induced voltage is expressed by the maximum value of the absolute values of the measured induced voltages.

In Example 18, the same cylindrical magnets as those in Example 16 were stacked in two stages at an offset angle of 90° in the same manner as that in Example 16, and were subjected to skew magnetization at a skew angle being ⅓ of a spanned angle of one of magnetic poles of the magnet, that is, at an angle of 20°. The stack of the cylindrical magnets was assembled as a rotor in the motor.

In Example 19, the same cylindrical magnets as those in Example 17 were stacked in three stages in such a manner as to be sequentially offset from each other at an offset angle of 60° as shown in FIG. 16 and were magnetized without any skewing. The stack of the cylindrical magnets was assembled as a rotor in a motor including a stator having teeth skewed at a skew angle being ⅓ of a spanned angle of one of magnetic poles of the magnet, that is, at an angle of 20°.

In Reference Example 4, a cylindrical magnet was produced in the same procedure as that in Example 15, except that any stacking was not performed. The cylindrical magnet thus obtained was assembled in the motor in the same manner as that in Example 18. In Comparative Example 7, a stack of cylindrical magnets was prepared in the same manner as that in Example 15, except that the core of the mold was made from a non-magnetic material (non-magnetic cemented carbide material WC—Ni—Co), and was assembled in the motor in the same manner as that in Example 18.

The motor prepared in each of Examples 18 and 19, Reference Example 4 and Comparative Example 7 was measured in terms of induced voltage and torque ripple. The results are shown in Table 7. It is to be noted that the torque ripple is expressed by a difference between the maximum value and the minimum value of the measured torque ripples.

From the results shown in Table 7, it becomes apparent that the motor in each of Examples 18 and 19 exhibits a sufficiently large induced voltage from the practical viewpoint and also a sufficiently small torque ripple, while the motor in Reference Example 4 exhibits a large torque ripple, and the motor in Comparative Example 7 exhibits a low induced voltage and is thereby not practically usable.

Reference Example 5

A stack of cylindrical magnets was produced in the same procedure as that in Example 18, except that a diametrically oriented cylindrical magnet was subjected to skew magnetization at a skew angle being ⅚ of a spanned angle of one of magnetic poles of the magnet, that is, at an angle of 50°. The stack of cylindrical magnets was assembled as a rotor in the motor shown in FIG. 10, and the motor was measured in terms of induced voltage and torque ripple in the same manner as that in Example 18. The results are shown in Table 7.

From the results shown in Table 7, it becomes apparent that the motor in Reference Example 5 exhibits a small torque ripple; however, since a reduction in induced voltage is large, the motor in Reference Example 5 is not practically usable.

Example 20

Six pieces of ring-shaped magnets, each being oriented in one direction, were produced by using the same Nd magnet alloy as that used in Example 15 by the horizontal-field vertical molding process. The magnet had an outer diameter of 25 mm, an inner diameter of 20 mm, and a thickness of 15 mm. The ring-shaped magnets were stacked in six stages in such a manner as to be sequentially offset from each other at an offset angle of 60°, and were subjected to six-polar magnetization without any skewing, to produce a magnet rotor. The rotor was assembled in a motor including a stator having teeth skewed at a skew angle of 7°.

Reference Example 6

The same magnets as those in Example 20 were stacked in such a manner that the orientation magnetic field directions of the magnets was set to one direction, and were subjected to six-polar magnetization without any skewing, to produce a magnet rotor. The magnet rotor was assembled in a stator having non-skewed teeth, to prepare a motor.

The motor in each of Example 20 and Reference Example 6 was measured in terms of induced voltage and torque ripple. The results are shown in Table 7.

From the results shown in Table 7, it becomes apparent that the torque ripple of the motor in Example 20 is very lower than that of the motor in Reference Example 6. This means that the effect of dispersing the orientation magnetic field directions of the magnets according to the present invention becomes evident.

TABLE 7

| | Induced voltage [V] | Torque ripple [Nm] |
|---|---|---|
| Example 18 | 92 | 0.028 |
| Example 19 | 100 | 0.021 |
| Example 20 | 156 | 0.08 |
| Reference Example 4 | 92 | 0.135 |
| Comparative Example 7 | 50 | 0.024 |
| Reference Example 5 | 13 | 0.015 |
| Reference Example 6 | 145 | 0.432 |

While the preferred embodiments of the present invention have been described using the specific terms, such description is for illustrative purposes only, and it is to be understood that changes and variations may be made without departing from the scope and spirit of the following claims.

The invention claimed is:

1. A permanent magnet motor using a permanent magnet which is multipolar magnetized in the peripheral direction, comprising:

a stator having a plurality of teeth; and a radial anisotropic cylindrical magnet assembled in said motor so as to be combined with said stator;

wherein said radial anisotropic cylindrical magnet comprises a portion magnetically oriented in directions tilted at an angle of 30° or more from radial directions, said portion being contained in said magnet at a volume ratio in a range of 2% or more and 50% or less; and a portion magnetically oriented in direction being radial directions or in directions tilted at an angle less than 30° from radial directions, said portion being the rest of the total volume of said magnet;

said radial anisotropic cylindrical magnet comprises sintered magnet powder, said radial anisotropic cylindrical magnet being produced by preparing a metal mold having a core including, in at least part thereof, a ferromagnetic body having a saturated magnetic flux density of 5 kG or more, packing a magnet powder in a cavity of the metal mold, molding and sintering the magnet powder while applying an orientation magnetic field to the magnet powder by a horizontal-field vertical molding process; and said cylindrical magnet has 2n magnetized poles in the peripheral direction, where n is a positive integer in a range of 2 or more and 50 or less, said stator has 3m teeth to be combined with said cylindrical magnet, where m is a positive integer in a range of 2 or more and 33 or less, and the values 2n and 3m satisfy a relationship of $2n \neq 3m$.

2. A permanent magnet motor using a permanent magnet which is multipolar magnetized in the peripheral direction, comprising:

a stator having a plurality of teeth; and a radial anisotropic cylindrical magnet assembled in said motor so as to be combined with said stator, wherein said radial anisotropic cylindrical magnet comprises a portion magnetically oriented in directions tilted at an angle of 30° or more from radial directions, said portion being contained in said magnet at a volume ratio in a range of 2% or more and 50% or less; and a portion magnetically oriented in direction being radial directions or in directions tilted at an angle less than 30° from radial directions, said portion being the rest of the total volume of said magnet, said radial anisotropic cylindrical magnet comprises sintered magnet powder, said radial anisotropic cylindrical magnet being produced by preparing a metal mold having a core including, in at least part thereof, a ferromagnetic body having a saturated magnetic flux density of 5 kG or more, packing a magnet powder in a cavity of the metal mold, molding and sintering the magnet powder while applying an orientation magnetic field to the magnet powder by a horizontal-field vertical molding process, and said cylindrical magnet has k magnetized poles in the peripheral direction, where k is a positive even number of 4 or more, said stator has $3k \cdot j/2$ teeth to be combined with said cylindrical magnet, where j is a positive integer in a range of 1 or more.

3. A permanent magnet rotor according to claim 1 or 2, wherein a boundary between an N-pole and an S-pole of said cylindrical magnet is located in a region offset at an angle within ±10° from the center of a portion oriented in directions tilted at an angle of 30° or more from radial directions.

4. A permanent magnet according to claim 1 or 2, wherein a skew angle of said cylindrical magnet is in a range of 1/10 to 2/3 of a spanned angle of one magnetic pole of said cylindrical magnet.

5. A permanent magnet according to claim 1 or 2, wherein a skew angle of said teeth of said stator is in a range of 1/10 to 2/3 of a spanned angle of one magnetic pole of said cylindrical magnet.

6. A permanent magnet motor according to claim 1 or 2, wherein the magnetic field generated in said horizontal-field vertical molding step is in a range of 0.5 to 12 kOe.

7. A multistage long-sized multipolar magnetized cylindrical magnet rotor comprising:

a plurality of radial anisotropic cylindrical magnets stacked in two stages or more in the axial direction, wherein each of said radial anisotropic cylindrical magnet comprises a portion magnetically oriented in directions tilted at an angle of 30° or more from radial directions, said portion being contained in said magnet at a volume ratio in a range of 2% or more and 50% or less; and a portion magnetically oriented in direction being radial directions or in directions tilted at an angle less than 30° from radial directions, said portion being the rest of the total volume of said magnet, and each of said plurality of radial anisotropic cylindrical magnets comprises sintered magnet powder, each of said plurality of radial anisotropic cylindrical magnets being produced by preparing a metal mold having a core including, in at least part thereof, a ferromagnetic body having a saturated magnetic flux density of 5 kG or more, packing a magnet powder in a cavity of the metal mold, molding and sintering the magnet powder while applying an orientation magnetic field to the magnet powder by a horizontal-field vertical molding process, and multipolar-magnetizing the cylindrical magnet thus produced.

8. A multistage long-sized multipolar magnetized cylindrical magnet rotor according to claim 7, wherein the stacked number of said cylindrical magnets is i, where i is a positive integer in a range of 2 or more and 10 or less, said cylindrical magnets of the number of i are stacked to each other while being sequentially offset from each other in such a manner that the same direction as an orientation magnetic field direction of each of said cylindrical magnets is offset from the next stacked one of said cylindrical magnets by an angle of 180°/i.

9. A multistage long-sized multipolar magnetized cylindrical magnet rotor according to claim 7 or 8, wherein the number of the multipolar magnetized magnetic poles is n, where n is a positive integer in a range of 4 or more and 50 or less, the stacked number i and the number n of the poles satisfy a relationship of i=n/2.

10. A multistage long-sized multipolar magnetized cylindrical magnet rotor according to claim 7 or 8, wherein at the time of multipolar magnetization of the poles of the number n on an outer peripheral surface of said cylindrical magnet, and skew magnetization is performed with a screw angle in a range of 1/10 to 2/3 of the angle 360°/n, where a spanned angle of one magnetic pole is 360°/n.

11. A permanent magnet motor according to claim 1 or 2, wherein said cavity has a cylindrical shape.

12. A multistage long-sized multipolar magnetized cylindrical magnet rotor according to claim 7, wherein said cavity has a cylindrical shape.

* * * * *